(12) United States Patent
Nojiri et al.

(10) Patent No.: US 11,630,342 B2
(45) Date of Patent: Apr. 18, 2023

(54) IMAGE DISPLAY DEVICE AND CIRCULARLY POLARIZING PLATE WITH PHOTOSENSITIVE ADHESIVE

(71) Applicant: FUJIFILM Corporation, Tokyo (JP)

(72) Inventors: Mayumi Nojiri, Kanagawa (JP); Satoshi Shimamura, Kanagawa (JP); Ryo Satake, Kanagawa (JP); Aiko Yoshida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 433 days.

(21) Appl. No.: 16/987,634

(22) Filed: Aug. 7, 2020

(65) Prior Publication Data

US 2020/0363682 A1    Nov. 19, 2020

Related U.S. Application Data

(63) Continuation of application No. PCT/JP2019/005338, filed on Feb. 14, 2019.

(30) Foreign Application Priority Data

Feb. 14, 2018   (JP) .............................. JP2018-023759

(51) Int. Cl.
  *G02F 1/1335*   (2006.01)
  *C09J 7/38*   (2018.01)
  (Continued)

(52) U.S. Cl.
  CPC ........ *G02F 1/133541* (2021.01); *C08J 7/043* (2020.01); *C08J 7/044* (2020.01);
  (Continued)

(58) Field of Classification Search
  CPC combination set(s) only.
  See application file for complete search history.

(56) References Cited

U.S. PATENT DOCUMENTS

2010/0045901 A1*  2/2010  Uehira ................. C07D 277/64
                                                                349/193
2015/0115199 A1   4/2015  Choi et al.
                    (Continued)

FOREIGN PATENT DOCUMENTS

CN       111727389 B  * 12/2021  .............. C08J 7/043
JP       2008-273925 A    11/2008
                    (Continued)

OTHER PUBLICATIONS

International Search Report issued in PCT/JP2019/005338 dated May 21, 2019.
Written Opinion issued in PCT/JP2019/005388 dated May 21, 2019.
International Preliminary Report on Patentability completed by WIPO dated Aug. 18, 2020 in connection with International Patent Application No. PCT/JP2019/005338.

*Primary Examiner* — Sophie Hon
(74) *Attorney, Agent, or Firm* — Edwards Neils LLC; Jean C. Edwards, Esq.

(57) ABSTRACT

An image display device which suppresses destruction of an image display panel due to static electricity carried by a phase difference film, and has excellent adhesiveness between the phase difference film and the image display panel even in a moisture-heat environment, and a circularly polarizing plate with a photosensitive adhesive. The image display device includes a circularly polarizing plate having a linear polarizer and a phase difference film, and an image display panel in this order from a viewing side, in which the phase difference film and the image display panel are bonded by a pressure-sensitive adhesive, the phase difference film has an optically anisotropic layer obtained by polymerizing a polymerizable liquid crystal composition containing at least one kind of polymerizable liquid crystal compound having a predetermined structure, and the pressure-sensitive (Continued)

adhesive contains a polymer having an acid value of 1 to 30 mgKOH/g and an antistatic agent.

20 Claims, 2 Drawing Sheets

(51) Int. Cl.
| | | |
|---|---|---|
| *C09J 4/06* | (2006.01) | |
| *C09K 19/34* | (2006.01) | |
| *C09K 19/52* | (2006.01) | |
| *C08J 7/043* | (2020.01) | |
| *C08J 7/044* | (2020.01) | |
| *C09K 19/04* | (2006.01) | |
| *G02F 1/13363* | (2006.01) | |
| *G02B 5/30* | (2006.01) | |
| *C08K 5/33* | (2006.01) | |
| *C08F 220/18* | (2006.01) | |

(52) U.S. Cl.
CPC ............... *C09J 4/06* (2013.01); *C09J 7/385* (2018.01); *C09K 19/04* (2013.01); *C09K 19/3491* (2013.01); *C09K 19/52* (2013.01); *G02B 5/3083* (2013.01); *G02F 1/13363* (2013.01); *G02F 1/133528* (2013.01); *G02F 1/133637* (2021.01); *G02F 1/133638* (2021.01); *C08F 220/1804* (2020.02); *C08K 5/33* (2013.01); *C09J 2433/00* (2013.01); *C09K 2019/0448* (2013.01); *C09K 2323/035* (2020.08); *C09K 2323/057* (2020.08)

(56) References Cited

U.S. PATENT DOCUMENTS

| | | | |
|---|---|---|---|
| 2015/0175564 A1 | 6/2015 | Sakamoto et al. | |
| 2016/0131809 A1* | 5/2016 | Takeda | G02F 1/13363 |
| | | | 349/194 |
| 2016/0334669 A1 | 11/2016 | Li et al. | |
| 2017/0369783 A1* | 12/2017 | Horiguchi | C07D 307/66 |
| 2018/0327668 A1* | 11/2018 | Horiguchi | C09K 19/54 |

FOREIGN PATENT DOCUMENTS

| | | | | |
|---|---|---|---|---|
| JP | 2009-242717 A | 10/2009 | | |
| JP | 2010-031223 A | 2/2010 | | |
| JP | 2010-084032 A | 4/2010 | | |
| JP | 2015-516972 A | 6/2015 | | |
| JP | 2016-081035 A | 5/2016 | | |
| JP | 6871474 B2 * | 5/2021 | ............. | C08J 7/043 |
| KR | 102442993 B1 * | 9/2022 | ............. | C08J 7/043 |
| WO | 2014/010325 A1 | 1/2014 | | |
| WO | 2018/012390 A1 | 1/2018 | | |

* cited by examiner

IMAGE DISPLAY DEVICE AND CIRCULARLY POLARIZING PLATE WITH PHOTOSENSITIVE ADHESIVE

CROSS-REFERENCE TO RELATED APPLICATIONS

This application is a Continuation of PCT International Application No. PCT/JP2019/005338 filed on Feb. 14, 2019, which was published under PCT Article 21(2) in Japanese, and which claims priority under 35 U.S.C. § 119(a) to Japanese Patent Application No. 2018-023759 filed on Feb. 14, 2018. The above applications are hereby expressly incorporated by reference, in their entirety, into the present application.

BACKGROUND OF THE INVENTION

1. Field of the Invention

The present invention relates to an image display device and a circularly polarizing plate with a photosensitive adhesive.

2. Description of the Related Art

A polymerizable compound exhibiting reciprocal wavelength dispersibility enables, for example, accurate conversion of light ray wavelengths over a wide wavelength range and reduction in the thickness of a phase difference film due to its high refractive index, and therefore, it has been actively studied.

Furthermore, for the polymerizable compound exhibiting reciprocal wavelength dispersibility, T-type molecular design guidelines have generally been adapted, and thus, it has been required to decrease the wavelength of the major axis of the molecule and increase the wavelength of the minor axis positioned at the center of the molecule.

In this regard, it is known that a cycloalkylene skeleton having no absorption wavelength is used for connection between a skeleton of the minor axis positioned at the center of the molecule (hereinafter also referred to as a "reciprocal wavelength dispersion expressing part") and the major axis of the molecule (see, for example, JP2010-031223A, WO2014/010325A, and JP2016-081035A).

It is known that such a phase difference film is processed into a polarizing plate or the like and then mounted on an image display panel using a pressure-sensitive adhesive or the like.

Moreover, in recent years, as various display devices, in particular, organic EL display devices have been developed in various applications, a demand for phase difference films has increased and it has been required for a reduction in a failure rate in a step of mounting the film on image display panels.

In addition, the phase difference film has been required to be applied not only to indoor environments but also to severe moisture-heat environments such as outdoor and on-vehicle applications.

SUMMARY OF THE INVENTION

From the viewpoint that a phenomenon of destruction of an image display panel by static electricity carried by a phase difference film upon the bonding of the phase difference film to the display panel is suppressed and the adhesiveness under a severe moisture-heat condition is improved, the present inventors have made attempts to use a pressure-sensitive adhesive in which an antistatic agent is blended.

Furthermore, the present inventors have clarified that in a case where such a pressure-sensitive adhesive is used, the birefringence index of a phase difference film using the polymerizable compound exhibiting reciprocal wavelength dispersibility described in JP2010-031223A, WO2014/010325A, and JP2016-081035A changes, which hinders the display performance of an image display device.

Therefore, an object of the present invention is to provide an image display device which suppresses destruction of an image display panel due to static electricity carried by a phase difference film, and has excellent adhesiveness between the phase difference film and the image display panel even in a moisture-heat environment and excellent display performance, and a circularly polarizing plate with a photosensitive adhesive.

The present inventors have conducted intensive studies to accomplish the object, and as a result, they have found that an image display device which suppresses destruction of an image display panel due to static electricity carried by a phase difference film, and has excellent adhesiveness between the phase difference film and the image display panel even in a moisture-heat environment and excellent display performance is provided by bonding the image display panel to a circularly polarizing plate having an optically anisotropic layer formed with a polymerizable liquid crystal composition containing a polymerizable liquid crystal compound having a predetermined structure as the phase difference film, using a pressure-sensitive adhesive containing a polymer satisfying a predetermined acid value together with an antistatic agent, thereby completing the present invention.

That is, the present inventors have found that the object can be accomplished by the following configurations.

[1] An image display device comprising:
a circularly polarizing plate having a linear polarizer and a phase difference film; and
an image display panel in this order from a viewing side,
in which the phase difference film included in the circularly polarizing plate and the image display panel are bonded by a pressure-sensitive adhesive,
the phase difference film has an optically anisotropic layer obtained by polymerizing a polymerizable liquid crystal composition containing at least one kind of polymerizable liquid crystal compound represented by Formula (I) which will be described later, and
the pressure-sensitive adhesive contains a polymer having an acid value of 1 to 30 mgKOH/g and an antistatic agent.

[2] The image display device as described in [1],
in which at least one kind of the polymerizable liquid crystal compound represented by Formula (I) which will be described later has a van der Waals volume of $Z^1$ or $Z^2$ contained in Ar in Formula (I) which will be described later of $0.3 \times 10^2$ $Å^3$ or more.

[3] The image display device as described in [1] or [2],
in which an I/O value of the liquid crystal compound included in the polymerizable liquid crystal composition is 0.51 or less as a weighted average value.

[4] The image display device as described in any one of [1] to [3],
in which Ar in Formula (I) which will be described later represents a group represented by Formula (Ar-2).

[5] The image display device as described in any one of [1] to [4], in which the polymerizable liquid crystal composition contains a polymerizable compound not corresponding to Formula (I) which will be described later and having two or more polymerizable groups.

[6] The image display device as described in any one of [1] to [5], in which the polymerizable liquid crystal composition contains a polymerization initiator.

[7] The image display device as described in [6], in which the polymerization initiator is an oxime-type polymerization initiator.

[8] The image display device as described in any one of [1] to [7], in which the optically anisotropic layer satisfies Formula (II) which will be described later.

[9] The image display device as described in any one of [1] to [8], in which the optically anisotropic layer is a λ/4 plate, and an angle between the slow axis of the λ/4 plate and the absorption axis of the linear polarizer is 30° to 60°.

[10] The image display device as described in any one of [1] to [8], in which the optically anisotropic layer is a positive C-plate, and the phase difference film further has λ/4 plate.

[11] A circularly polarizing plate with a photosensitive adhesive, comprising:

a linear polarizer, a phase difference film; and a pressure-sensitive adhesive layer in this order, in which the phase difference film has an optically anisotropic layer obtained by polymerizing a polymerizable liquid crystal composition containing at least one kind of polymerizable liquid crystal compound represented by Formula (I) which will be described later, and the pressure-sensitive adhesive layer contains a polymer having an acid value of 1 to 30 mgKOH/g and an antistatic agent.

According to the present invention, it is possible to provide an image display device which suppresses destruction of an image display panel due to static electricity carried by a phase difference film, and has excellent adhesiveness between the phase difference film and the image display panel even in a moisture-heat environment and excellent display performance, and a circularly polarizing plate with a photosensitive adhesive.

DESCRIPTION OF THE PREFERRED EMBODIMENTS

Figure 1:
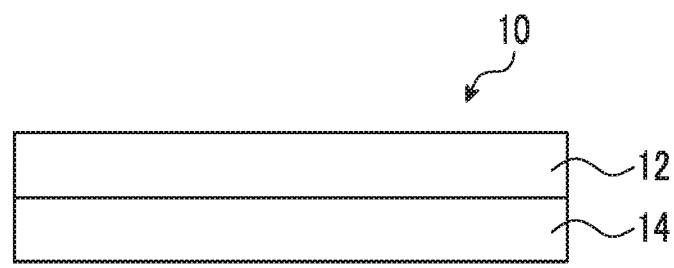
FIG. 1 is a schematic cross-sectional view showing an example of a phase difference film included in an image display device of an embodiment of the present invention.

Hereinafter, the present invention will be described in detail.

Descriptions on the constitutional requirements which will be described later are made based on representative embodiments of the present invention in some cases, but it should not be construed that the present invention is limited to such embodiments.

Furthermore, in the present specification, a numerical value range expressed using "to" means a range that includes the preceding and succeeding numerical values of "to" as the lower limit value and the upper limit value, respectively.

In addition, in the present specification, the bonding direction of a divalent group (for example, —O—CO—) as noted is not particularly limited unless the bonding position is specified, and for example, in a case where $D^1$ in Formula (I) which will be described later is —CO—O—, $D^1$ may be either *1-CO—O—*2 or *1-O—CO—*2, in which *1 represents a bonding position to the Ar side and *2 represents a bonding position to the $G^1$ side.

In addition, in the present specification, angles (for example, angles of "90°") and relationships thereof (for example, "orthogonal", "parallel", and "intersecting at 45°") include error ranges accepted in the technical field to which the present invention belongs. For example, the angle means an angle in a range of less than ±10° of a rigorous angle, and the error from the rigorous angle is preferably 5° or less, and more preferably 3° or less.

[Image Display Device]

The image display device of an embodiment of the present invention is an image display device having a circularly polarizing plate having a linear polarizer and a phase difference film; and an image display panel in this order from a viewing side.

Furthermore, in the image display device of the embodiment of the present invention, the phase difference film included in the circularly polarizing plate and the image display panel are bonded by a pressure-sensitive adhesive. Specifically, the bonding is performed using a pressure-sensitive adhesive containing a polymer having an acid value of 1 to 30 mgKOH/g and an antistatic agent.

In addition, in the image display device of the embodiment of the present invention, the phase difference film included in the circularly polarizing plate has an optically anisotropic layer obtained by polymerizing a polymerizable liquid crystal composition containing at least one a polymerizable liquid crystal compound represented by Formula (I) (hereinafter simply referred as a "polymerizable liquid crystal compound (I)").

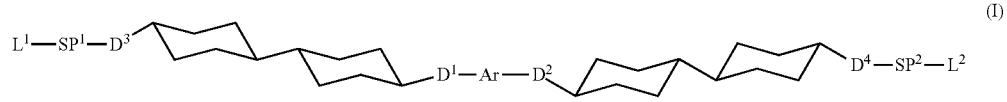

(I)

In the present invention, an image display device which suppresses destruction of an image display panel due to static electricity carried by a phase difference film, and has excellent adhesiveness between the phase difference film and the image display panel even in a moisture-heat environment and excellent display performance is provided by bonding the image display panel to a circularly polarizing plate having a linear polarizer and a phase difference film including an optically anisotropic layer formed with a polymerizable liquid crystal composition containing at least one kind of polymerizable liquid crystal compound (I), using a photosensitive adhesive containing a polymer satisfying a predetermined acid value together with an antistatic agent, as described above.

A reason therefor is not specifically clear, but is presumed to be as follows by the present inventors.

First, it is considered that by using a pressure-sensitive adhesive containing an antistatic agent, static electricity generated in a case where a separator is peeled off is quickly eliminated and destruction of the image display panel due to the static electricity carried by the phase difference film can be suppressed.

Furthermore, it is considered that by using a photosensitive adhesive containing a polymer satisfying a predetermined acid value, a decrease in the cohesive force of the polymer caused by aging with moisture heat is suppressed and the adhesiveness between the phase difference film and the image display panel is improved even in a moisture-heat environment.

In addition, it is considered that since the polymerizable liquid crystal compound (I) has a structure in which cyclohexane rings are connected with each other through a single bond in the major axis of the molecule, the compound becomes hydrophobic, and as a result, hydrolysis or disturbance in an alignment state in a moisture-heat environment of a phase difference film including an optically anisotropic layer thus formed is suppressed, and thus, the display performance is improved.

Hereinafter, the circularly polarizing plate and the image display panel included in the image display device of the embodiment of the present invention, and the pressure-sensitive adhesive used for the bonding thereof will be described in detail.

[Pressure-Sensitive Adhesive]

The pressure-sensitive adhesive used for the bonding between the circularly polarizing plate and the image display panel used in the image display device of the embodiment of the present invention is a composition containing a polymer having an acid value of 1 to 30 mgKOH/g and an antistatic agent.

Here, a term, the "pressure-sensitive adhesive", refers to an adhesive which is also called a pressure-sensitive adhesive, and enables the bonding by applying a certain degree of pressure in a case of bonding two members.

In addition, the "acid value (of a polymer)" represents an acid value per gram of the solid content of a target polymer and can be determined by a potentiometric titration method according to JIS K 0070:1992.

<Polymer>

The polymer included in the pressure-sensitive adhesive is not particularly limited as long as it has an acid value of 1 to 30 mgKOH/g, but is preferably an acryl resin.

Preferred examples of the acryl resin include an acryl resin having a structural unit derived from a (meth)acrylic ester represented by Formula (I) as a main component.

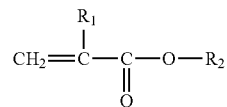

(In the formula, $R_1$ represents a hydrogen atom or a methyl group, and $R_2$ represents an alkyl group or aralkyl group having 1 to 14 carbon atoms, which may be substituted with an alkoxy group having 1 to 10 carbon atoms.)

Such an acryl resin is generally composed of a copolymer including other structural units, in particular, a monomer having a polar functional group, and preferably a structural unit derived from a (meth)acrylic acid-based compound having a polar functional group. Examples of the polar functional group include a free carboxyl group, a hydroxyl group, an amino group, and a heterocyclic group including an epoxy ring. Incidentally, a monomer other than Formula (I) having no polar functional group may also be copolymerized. Examples of the copolymer component which can be suitably used include a monomer having one olefinic double bond and at least one aromatic ring in the molecule, and preferably a (meth)acrylic acid-based compound having an aromatic ring. Moreover, In the present specification, the (meth)acrylic acid means either an acrylic acid or a methacrylic acid, and in addition, the same shall apply to "(meth)" in a case of referring to a (meth)acrylate and the like.

In Formula (I) which is a main structural unit of the acryl resin, $R_1$ is a hydrogen atom or a methyl group, and $R_2$ is an alkyl or aralkyl group having 1 to 14 carbon atoms, and preferably an alkyl group. In the alkyl group or the aralkyl group represented by $R_2$, a hydrogen atom in each group may be substituted by an alkoxy group having 1 to 10 carbon atoms.

Specific examples of the (meth)acrylic ester represented by Formula (I) include linear alkyl acrylate esters such as methyl acrylate, ethyl acrylate, propyl acrylate, n-butyl acrylate, n-octyl acrylate, and lauryl acrylate; branched alkyl acrylate esters such as isobutyl acrylate, 2-ethylhexyl acrylate, and isooctyl acrylate; linear alkyl methacrylate esters such as methyl methacrylate, ethyl methacrylate, propyl methacrylate, n-butyl methacrylate, n-octyl methacrylate, and lauryl methacrylate; and branched alkyl methacrylate esters such as isobutyl methacrylate, 2-ethylhexyl methacrylate, and isooctyl methacrylate.

In a case where $R_2$ is an alkyl group substituted with an alkoxy group, that is, in a case where $R_2$ is an alkoxyalkyl group, specific examples of the (meth)acrylic ester represented by Formula (I) include 2-methoxyethyl acrylate, ethoxymethyl acrylate, 2-methoxyethyl methacrylate, and ethoxymethyl methacrylate. In a case where $R_2$ is an aralkyl group, specific examples of the (meth)acrylic ester represented by Formula (I) include benzyl acrylate and benzyl methacrylate.

Such the (meth)acrylic esters may be used singly or in combination of a plurality of the different ones. Among those, n-butyl acrylate is preferably used, and specifically, it is preferable that the n-butyl acrylate accounts for 50% by weight or more of all monomers constituting the acryl resin. Obviously, in addition to n-butyl acrylate, other (meth)acrylic esters corresponding to Formula (I) can also be used in combination.

In a case where a monomer other than Formula (I) having one olefinic double bond and at least one aromatic ring in the molecule, for example, a (meth)acrylic acid-based compound having an aromatic ring is copolymerized, in addition to the (meth)acrylic ester represented by Formula (I), preferred examples of such a (meth)acrylic acid-based compound having an aromatic ring includes a phenoxyethyl group-containing (meth)acrylic ester represented by Formula (III).

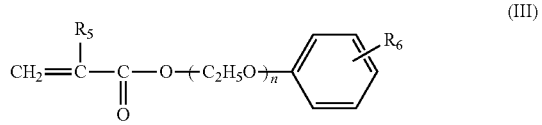

(III)

In the formula, $R_5$ represents a hydrogen atom or a methyl group, n represents an integer of 1 to 8, and $R_6$ represents a hydrogen atom, an alkyl group, an aralkyl group, or an aryl group. In a case where $R_6$ is an alkyl group, the number of carbon atoms can be approximately 1 to 9; in a case where $R_6$ is an aralkyl group, the number of carbon atoms can be approximately 7 to 11; and in a case where $R_6$ is an aryl group, the number of carbon atoms can be approximately 6 to 10.

Examples of the alkyl group having 1 to 9 carbon atoms constituting $R_6$ in Formula (III) include methyl, butyl, and nonyl, examples of the aralkyl group having 7 to 11 carbon atoms constituting $R_6$ include benzyl, phenethyl, and naphthylmethyl, and examples of the aryl group having 6 to 10 carbon atoms constituting $R_6$ include phenyl, tolyl, and naphthyl.

Specific examples of the phenoxyethyl group-containing (meth)acrylic ester represented by Formula (I) include 2-phenoxyethyl (meth)acrylate, 2-(2-phenoxyethoxy)ethyl (meth)acrylate, a (meth)acrylic ester of ethylene oxide-modified nonylphenol, and 2-(o-phenylphenoxy)ethyl (meth)acrylate. These phenoxyethyl group-containing (meth)acrylic esters may be used singly or as a blend of a plurality of different ones.

Among those, 2-phenoxyethyl (meth)acrylate, 2-(o-phenylphenoxy)ethyl (meth)acrylate, or 2-(2-phenoxyethoxy)ethyl (meth)acrylate is preferably used as one of the aromatic ring-containing monomers constituting the acryl resin. It is also effective to use these monomers in combination.

Examples of the monomer having a polar functional group include a monomer having a free carboxyl group, such as acrylic acid, methacrylic acid, and β-carboxyethyl acrylate; a monomer having a hydroxyl group, such as 2-hydroxyethyl (meth)acrylate, 2-hydroxypropyl (meth)acrylate, 2- or 3-chloro-2-hydroxypropyl (meth)acrylate, and diethylene glycol mono(meth)acrylate; a monomer having a heterocyclic group, such as acryloylmorpholine, vinylcaprolactam, N-vinyl-2-pyrrolidone, tetrahydrofurfuryl (meth)acrylate, caprolactone-modified tetrahydrofurfuryl acrylate, 3,4-epoxycyclohexylmethyl(meth)acrylate, glycidyl (meth)acrylate, and 2,5-dihydrofuran; and a monomer having an amino group different from a heterocyclic ring, such as N,N-dimethylaminoethyl (meth)acrylate. These monomers having a polar functional group may be used singly or in combination of a plurality of different ones.

Among those, the monomer having a free carboxyl group is used as one of the polar functional group-containing monomers constituting the acryl resin. This makes it possible to maintain the adhesiveness even with aging under a severe moisture-heat condition. Specifically, acrylic acid and methacrylic acid are preferable, and it is preferable that the acrylic acid or the methacrylic acid accounts for 0.2% to 5% by weight of all monomers constituting the acryl resin. In addition, another monomer having a polar functional group, for example, a monomer having a hydroxyl group can be used in combination therewith.

The acryl resin which can be suitably used for the pressure-sensitive adhesive contains a structural unit derived from the (meth)acrylic ester represented by Formula (I) in the proportion of usually 60% to 99.9% by weight, and preferably 80% to 99.6% by weight, contains a structural unit derived from a monomer other than Formula (I), having an aromatic ring, in a proportion of usually 0% to 40% by weight, and preferably 6% to 12% by weight, and contains a structural unit derived from a monomer having a polar functional group in a proportion of usually 0.1% to 20% by weight, and preferably 0.4% to 10% by weight, each with respect to a total amount of the solid contents.

The acryl resin that can be suitably used for the pressure-sensitive adhesive has the (meth)acrylic ester of Formula (I) described above, a monomer other than Formula (I), having an aromatic ring, and a polar functional group. In addition to the monomer, it may contain a structural unit derived from another monomer. Examples of the structural unit include a structural unit derived from a (meth)acrylic ester having an alicyclic structure in the molecule, a structural unit derived from a styrene-based monomer, a structural unit derived from a vinyl-based monomer, a structural unit derived from a monomer having a plurality of (meth)acryloyl groups in the molecule, and a (meth)acrylamide derivative.

The alicyclic structure is a cycloparaffin structure having usually 5 or more carbon atoms, and preferably approximately 5 to 7 carbon atoms. Specific examples of the acrylic ester having an alicyclic structure include isobornyl acrylate, cyclohexyl acrylate, dicyclopentanyl acrylate, cyclododecyl acrylate, methylcyclohexyl acrylate, trimethylcyclohexyl acrylate, tert-butylcyclohexyl acrylate, cyclohexyl acrylate, α-ethoxycyclohexyl acrylate, and cyclohexylphenyl acrylate, and specific examples of the methacrylic ester having an alicyclic structure include isobornyl methacrylate, cyclohexyl methacrylate, dicyclopentanyl methacrylate, cyclododecyl methacrylate, methylcyclohexyl methacrylate, trimethylcyclohexyl methacrylate, tert-butylcyclohexyl methacrylate, and cyclohexylphenyl methacrylate.

Examples of the styrene-based monomer include alkylstyrenes such as methylstyrene, dimethylstyrene, trimethylstyrene, ethylstyrene, diethylstyrene, triethylstyrene, propylstyrene, butylstyrene, hexylstyrene, heptystyrene, and octylstyrene; halogenated styrenes such as fluorostyrene, chlorostyrene, bromostyrene, dibromostyrene, and iodostyrene; and nitrostyrene, acetylstyrene, methoxystyrene, and divinylbenzene, in addition to styrene.

Examples of the vinyl-based monomers include fatty acid vinyl esters such as vinyl acetate, vinyl propionate, vinyl butyrate, vinyl 2-ethylhexanoate, and vinyl laurate; vinyl halides such as vinyl chloride and vinyl bromide; vinylidene halides such as vinylidene chloride; nitrogen-containing aromatic vinyls such as vinylpyridine, vinylpyrrolidone, and vinylcarbazole; conjugated diene monomers such as butadiene, isoprene, and chloroprene; and acrylonitrile and methacrylonitrile.

Examples of the monomers having a plurality of (meth)acryloyl groups in the molecule include two (meth)acryloyl groups in the molecule such as 1,4-butanediol di(meth)acrylate, 1,6-hexanediol di(meth)acrylate, 1,9-nonanediol di(meth)acrylate, ethylene glycol di(meth)acrylate, diethylene glycol di(meth)acrylate, tetraethylene glycol di(meth)acrylate, and tripropylene glycol di(meth)acrylate; monomer having three (meth)acryloyl groups in the molecule, such as trimethylolpropane tri (meth)acrylate.

Examples of the (meth)acrylamide derivatives include N-methylol (meth)acrylamide, 2-hydroxyethyl (meth)acrylamide, 3-hydroxypropyl (meth)acrylamide, 4-hydroxybutyl (meth)acrylamide, 5-hydroxypentyl (meth)acrylamide, 6-hydroxyhexyl (meth)acrylamide, N-methoxymethyl (meth)acrylamide, N-ethoxymethyl (meth)acrylamide, N-propoxymethyl (meth)acrylamide, N-butoxymethyl (meth)acrylamide, N,N-dimethyl (meth)acrylamide, N,N-diethyl (meth)acrylamide, N-isopropyl (meth)acrylamide, N-dimethylaminopropyl (meth)acrylamide, N-(1,1-dimethyl-3-oxobutyl) (meth)acrylamide, N-[2-(2-oxo-1-imidazolidinyl)ethyl] (meth)acrylamide, and 2-acryloylamino-2-methyl-1-propanesulfonic acid.

The monomers other than the (meth)acrylic ester of Formula (I), the monomer other than Formula (I), having an aromatic ring, and the monomer having a polar functional group may be used singly or in combination of two or more kinds thereof. In the acryl resin used for the photosensitive adhesive, a structural unit derived from the monomers other than the (meth)acrylic ester of Formula (I), the monomer other than Formula (I), having an aromatic ring, and the monomer having a polar functional group is contained in a proportion of usually 0 to 20 parts by weight, and preferably 0 to 10 parts by weight, with respect to the total amount of the solid contents of the resin.

The polymer component of the pressure-sensitive adhesive has a structural unit derived from the (meth)acrylic ester represented by Formula (I) as a main component, and includes a structural unit derived from the monomer having a polar functional group, as described above, and may optionally include two or more kinds of acryl resins including a structural unit derived from the monomer other than Formula (I) further having an aromatic ring. In addition, the acryl resin may be mixed with another acryl resin, specifically, for example, an acryl resin having a structural unit derived from the (meth)acrylic ester of Formula (I) and having no polar functional group. It is preferable that the acryl resin having a structural unit derived from the (meth)acrylic ester of Formula (I) as a main component and including a structural unit derived from the monomer having a polar functional group accounts for 60% by weight or more or 80% by weight or more of the entire acryl resin.

The acryl resin having a structural unit derived from the (meth)acrylic ester of Formula (I) as a main component and including a structural unit derived from the monomer having a polar functional group preferably has a weight-average molecular weight (Mw) in terms of standard polystyrene as determined by gel permeation chromatography (GPC) in the range of 1,000,000 to 2,000,000. In a case where the weight-average molecular weight in terms of standard polystyrene is 1,000,000 or more, the adhesiveness under a high temperature and a high humidity is improved, a possibility of floating or peeling between a glass substrate and a photosensitive adhesive layer tends to be reduced, and in addition, the peeling property in reworking process tends to be improved, which is thus preferable. Further, in a case where the weight-average molecular weight is 2,000,000 or less and the photosensitive adhesive layer is bonded to the phase difference film, the photosensitive adhesive layer undergoes changes following a dimensional change even with a change in the dimension of the phase difference film, and as a result, there is no difference between the brightness at the peripheral part and the brightness at the central part of a liquid crystal cell, and white spots or color unevenness tends to be suppressed, which is thus preferable. The molecular weight distribution represented by a ratio (Mw/Mn) of the weight-average molecular weight (Mw) to the number-average molecular weight (Mn) is usually in the range of approximately 2 to 10.

The acryl resin may be composed of only the relatively high molecular weight resin as described above or may be composed of a mixture of such an acryl resin and another acryl resin. Examples of the acryl resin which can be used in mixture includes an acryl resin having a structural unit derived from the (meth)acrylic ester represented by Formula (I) as a main component and having a weight-average molecular weight in the range of 50,000 to 300,000.

An acryl resin (in a case where two or more kinds thereof are combined, a mixture thus formed) preferably exhibits a viscosity of 20 Pa·s or less and 0.1 to 7 Pa·s at 25° C. in a case of being used in the form of a solution prepared by dissolving the acryl resin in ethyl acetate to a concentration of the solid content of 20% by weight. In a case where the viscosity at this time is 20 Pa·s or less, the adhesiveness under a high temperature and a high humidity is improved, a possibility of occurrence of floating or peeling between the glass substrate and the photosensitive adhesive layer tends to be reduced, and the peeling property in reworking process tends to be improved, which is thus preferable. The viscosity can be measured with a Brookfield viscometer.

The acryl resin constituting the photosensitive adhesive composition can be produced by various known methods such as a solution polymerization method, an emulsion polymerization method, a bulk polymerization method, and a suspension polymerization method. In the production of this acryl resin, a polymerization initiator is usually used. The polymerization initiator is used in an amount of approximately 0.001 to 5 parts by weight with respect to 100 parts by weight of all the monomers used for the production of the acryl resin.

As the polymerization initiator, a thermal polymerization initiator, a photopolymerization initiator, or the like is used. Examples of the photopolymerization initiator include 4-(2-hydroxyethoxy)phenyl(2-hydroxy-2-propyl)ketone. Examples of the thermal polymerization initiator include azo compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate), and 2,2'-azobis(2-hydroxymethylpropionitrile); organic peroxides such as lauryl peroxide, tert-butyl hydroperoxide, benzoyl peroxide, tert-butylperoxybenzoate, cumene hydroperoxide, diisopropyl peroxydicarbonate, dipropyl peroxydicarbonate, tert-butyl peroxyneodecanoate, tert-butyl peroxypivalate, and (3,5,5-trimethylhexanoyl) peroxide; and inorganic peroxides such as potassium persulfate, ammonium persulfate, and hydrogen peroxide. Further, a redox initiator using a peroxide and a reducing agent in combination can also be used as the polymerization initiator.

As the method for producing the acryl resin, the solution polymerization method is preferable among the methods described above. By way of a specific example of the solution polymerization method, a method in which desired monomers and an organic solvent are mixed, a thermal polymerization initiator is added thereto in a nitrogen atmosphere, and the mixture is stirred at approximately 40° C. to 90° C., and preferably approximately 60° C. to 80° C. for approximately 3 to 10 hours can be mentioned. Further, in order to control the reaction, a monomer or a thermal polymerization initiator may be added continuously or intermittently during the polymerization, or may be added in a state of being dissolved in an organic solvent. Here, as the organic solvent, for example, aromatic hydrocarbons such as toluene and xylene; esters such as ethyl acetate and butyl acetate; aliphatic alcohols such as propyl alcohol and isopropyl alcohol; ketones such as acetone, methyl ethyl ketone, and methyl isobutyl ketone; or the like can be used.

<Antistatic Agent>

The antistatic agent included in the pressure-sensitive adhesive is not particularly limited, but is preferably an organic antistatic agent having a pyridinium salt or a quaternary ammonium salt from the viewpoint of case of handling, and the like, and among these, the organic antistatic agent having a pyridinium salt is more preferable.

Specific preferred examples of the pyridinium salt include a pyridinium salt represented by Formula (II).

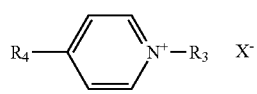

(II)

(In the formula, $R_3$ represents a linear alkyl group having 12 to 16 carbon atoms, $R_4$ represents a hydrogen atom or a methyl group, and $X^-$ represents an ion having a fluorine atom.)

The cation component constituting the pyridinium salt of Formula (II) is an N-alkylpyridinium cation, and from the viewpoint of durability in a case where the cation component is bonded to glass via a photosensitive adhesive layer, a cation component in which a linear alkyl group represented by $R_3$ in Formula (II) has 12 to 16 carbon atoms is used. Specific examples of the cation component is any of the following ones.

An N-dodecylpyridinium ion,
an N-tridecylpyridinium ion,
an N-tetradecylpyridinium ion,
an N-pentadecylpyridinium ion,
an N-hexadecylpyridinium ion,
an N-dodecyl-4-methylpyridinium ion,
an N-tridecyl-4-methylpyridinium ion,
an N-tetradecyl-4-methylpyridinium ion,
an N-pentadecyl-4-methylpyridinium ion, and an N-hexadecyl-4-methylpyridinium ion.

On the other hand, the anion component $X^-$ constituting the pyridinium salt of Formula (II) is an ion having a fluorine atom since it provides an ionic compound having excellent antistatic performance. Specific examples of the anion component can be as follows.

A fluorine ion $[F^-]$,
a tetrafluoroborate ion $[BF_4^-]$,
a hexafluorophosphate ion $[PF_6^-]$,
a trifluoroacetate ion $[CF_3COO^-]$,
a trifluoromethanesulfonate ion $[CF_3SO_3^-]$,
a bis(fluorosulfonyl)imide ion $[(FSO_2)_2N^-]$,
a bis(trifluoromethanesulfonyl)imide ion $[(CF_3SO_2)_2N^-]$,
a tris(trifluoromethanesulfonyl)methanide ion $[(CF_3SO_2)_3C^-]$,
a hexafluoroarsenate ion $[AsF_6^-]$,
a hexafluoroantimonate ion $[SbF_6^-]$,
a hexafluoroniobate ion $[NbF_6^-]$,
a hexafluorotantalate ion $[TaF_6^-]$,
a (poly)hydrofluorofluoride ion $[F(HF)_n^-]$ (n is approximately 1 to 3),
a perfluorobutanesulfonate ion $[C_4F_9SO_3^-]$,
a bis(pentafluoroethanesulfonyl)imide ion $[(C_2FSO_2)_2N^-]$,
a perfluorobutanoate ion $[C_3F_7COO^-]$,
a (trifluoromethanesulfonyl)(trifluoromethanecarbonyl)imide ion $[(CF_3SO_2)(CF_3CO)N^-]$, and the like.

Specific examples of such a pyridinium salt can be appropriately selected from combinations of the cation component and the anion component. Specific examples of the compound which is a combination of the cation component and the anion component include compounds as follows.

N-dodecylpyridinium hexafluorophosphate,
N-tetradecylpyridinium hexafluorophosphate,
N-hexadecylpyridinium hexafluorophosphate,
N-dodecyl-4-methylpyridinium hexafluorophosphate,
N-tetradecyl-4-methylpyridinium hexafluorophosphate,
N-hexadecyl-4-methylpyridinium hexafluorophosphate,
N-dodecylpyridinium bis(fluorosulfonyl)imide,
N-tetradecylpyridinium bis(fluorosulfonyl)imide,
N-hexadecylpyridinium bis(fluorosulfonyl)imide,
N-dodecyl-4-methylpyridinium bis(fluorosulfonyl)imide,
N-tetradecyl-4-methylpyridinium bis(fluorosulfonyl)imide,
N-hexadecyl-4-methylpyridinium bis(fluorosulfonyl)imide,
N-dodecylpyridinium bis(trifluoromethanesulfonyl)imide,
N-tetradecylpyridinium bis(trifluoromethanesulfonyl)imide,
N-hexadecylpyridinium bis(trifluoromethanesulfonyl)imide,
N-dodecyl-4-methylpyridinium bis(trifluoromethanesulfonyl)imide,
N-tetradecyl-4-methylpyridinium bis(trifluoromethanesulfonyl)imide,
N-hexadecyl-4-methylpyridinium bis(trifluoromethanesulfonyl)imide, and the like.

In the pyridinium salt of Formula (II), the alkyl group represented by $R_3$ may be a long chain, but a production thereof itself can be carried out according to a general pyridinium salt. For example, the pyridinium salt of Formula (II) can be produced by subjecting an alkylpyridinium bromide corresponding to the following formula and a lithium salt corresponding to Formula: $LiX^-$ (in which X is as defined above in Formula (II)) to an ion exchange reaction, followed by washing with water, transferring a lithium bromide thus formed to the aqueous phase, and recovering the organic phase.

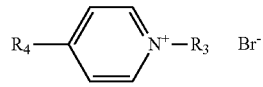

(In the formula, $R_3$ and $R_4$ are each as defined above in Formula (II)). These pyridinium salts can be used singly or in combination of two or more kinds thereof. Obviously, examples of the pyridinium salt are not limited to the compounds listed above.

The pyridinium salt of Formula (I) is preferably contained in the proportion of 0.2 to 8 parts by weight with respect to 100 parts by weight of the solid content of the above-described acryl resin (in a case where two or more kinds thereof are used, a total thereof). In a case where the pyridinium salt is contained in the amount of 0.2 parts by weight or more with respect to 100 parts by weight of the solid content of the acryl resin, the antistatic performance is improved, which is thus preferable, and in a case where the amount is 8 parts by weight or less, the durability is easily maintained, which is thus preferable. The amount of the pyridinium salt with respect to 100 parts by weight of the solid content of the acryl resin can be in the range of 0.2 to 6 parts by weight, and is preferably from 0.5 parts by weight to 3 parts by weight.

<Optional Components>

The pressure-sensitive adhesive may contain a crosslinking agent.

The crosslinking agent is a compound that reacts with a structural unit derived from, in particular, the monomer having a polar functional group in the acryl resin to crosslink the acryl resin. Specific examples thereof include an isocyanate-based compound, an epoxy-based compound, an aziridine-based compound, and a metal chelate-based compound. Among those, the isocyanate-based compound, the epoxy-based compound, and the aziridine-based compound have at least two functional groups in the molecule which can react with a polar functional group in the acryl resin.

The isocyanate-based compound is a compound having at least two isocyanato groups (—NCO) in the molecule, and examples thereof include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, naphthalene diisocyanate, and triphenylmethane triisocyanate. In addition, an adduct obtained by reacting a polyol such as glycerol and trimethylolpropane with the isocyanate compound, or a dimer, a trimer, or the like of the isocyanate compound is also used as a crosslinking agent used for a photosensitive adhesive. Two or more kinds of the isocyanate-based compounds may be mixed before being used.

The epoxy-based compound is a compound having at least two epoxy groups in the molecule, and examples thereof include a bisphenol A type epoxy resin, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, N,N-diglycidylaniline, N,N,N',N'-tetraglycidyl-m-xylenediaminc, and 1,3-bis(N,N'-diglycidylaminomethyl)cyclohexane. Two or more kinds of the epoxy-based compounds can be mixed before being used.

The aziridine-based compound is a compound having at least two 3-membered ring skeletons consisting of one nitrogen atom and two carbon atoms in the molecule, also called ethylenimine, and examples thereof include diphenylmethane-4,4'-bis(1-aziridinecarboxamide), toluene-2,4-bis(1-aziridinecarboxamide), triethylenemelamine, isophthaloyl bis-1-(2-methylaziridine), tris-1-aziridinylphosphine oxide, hexamethylene, 1,6-bis(1-aziridinecarboxamide), trimethylolpropane-tri-pi-aziridinylpropionate, and tetramethylolmethane-tri-β-aziridinylpropionate.

Examples of the metal chelate compound include a compound in which acetylacetone or ethyl acetoacetate is coordinated with a polyvalent metal such as aluminum, iron, copper, zinc, tin, titanium, nickel, antimony, magnesium, vanadium, chromium, and zirconium.

Among those crosslinking agents, the isocyanate-based compound, in particular, xylylene diisocyanate, tolylene diisocyanate, or hexamethylene diisocyanate, an adduct obtained by reacting such the isocyanate compound with a polyol such as glycerol and trimethylolpropane, a mixture of dimers, trimers, and the like of the isocyanate compound, a mixture of such isocyanate-based compounds, or the like is preferably used. Preferred examples of the isocyanate-based compound include tolylene diisocyanate, an adduct obtained by reacting tolylene diisocyanate with a polyol, a dimer of tolylene diisocyanate, a trimer of tolylene diisocyanate, hexamethylene diisocyanate, an adduct obtained by reacting hexamethylene diisocyanate with a polyol, a dimer of hexamethylene diisocyanate, and a trimer of hexamethylene diisocyanate.

The crosslinking agent is preferably blended in a proportion of 0.1 to 5 parts by weight with respect to 100 parts by weight of the acryl resin (in a case where two or more kinds thereof are used, a total thereof). In a case where the amount of the crosslinking agent is 0.1 parts by weight or more with respect to 100 parts by weight of the acryl resin, the durability of the photosensitive adhesive layer tends to be improved, which is thus preferable, and in a case where the amount of the crosslinking agent is 5 parts by weight or less, white spots become less remarkable upon application of a circularly polarizing plate with a photosensitive adhesive to an organic EL display device, which is thus preferable.

[Circularly Polarizing Plate]

The circularly polarizing plate included in the image display device of the embodiment of the present invention has a linear polarizer and a phase difference film.

<Linear Polarizer>

A linear polarizer included in the circularly polarizing plate is not particularly limited as long as it is a member having a function of converting light into specific linearly polarized light, and an absorptive type polarizer and a reflective type polarizer, which are known in the related art, can be used.

An iodine-based polarizer, a dye-based polarizer using a dichroic dye, a polyene-based polarizer, or the like is used as the absorptive type polarizer. The iodine-based polarizer and the dye-based polarizer are classified into a coating type polarizer and a stretching type polarizer, any of which can be applied, but a polarizer which is manufactured by allowing polyvinyl alcohol to adsorb iodine or a dichroic dye and performing stretching is preferable.

In addition, examples of a method of obtaining a polarizer by carrying out stretching and dyeing in a state of a laminated film in which a polyvinyl alcohol layer is formed on a base material include the methods disclosed in JP5048120B, JP5143918B, JP4691205B, JP4751481B, and JP4751486B, and known technologies relating to these polarizers can also be preferably used.

A polarizer in which thin films having different birefringence are laminated, a wire grid-type polarizer, a polarizer having a combination of a cholesteric liquid crystal having a selective reflection range and a 114 wavelength plate, or the like is used as the reflective type polarizer.

Among those, a polarizer including a polyvinyl alcohol-based resin (a polymer including —$CH_2$—CHOH— as a repeating unit, in particular, at least one selected from the group consisting of a polyvinyl alcohol and an ethylene-vinyl alcohol copolymer) is preferable from the viewpoint that it has more excellent adhesiveness.

In the present invention, the thickness of the linear polarizer is not particularly limited, but is preferably 3 μm to 60 μm, more preferably 5 μm to 30 μm, and still more preferably 5 μm to 15 μm.

<Phase Difference Film>

The phase difference film included in the circularly polarizing plate has an optically anisotropic layer (hereinafter also simply referred to as an "optically anisotropic layer (I)") obtained by polymerizing a polymerizable liquid crystal composition (hereinafter formally referred to as a "polymerizable liquid crystal composition of the embodiment of the present invention") containing at least one kind of polymerizable liquid crystal compound (I).

Furthermore, the phase difference film may be a single-layer or multilayer film consisting of only the optically anisotropic layer (I), and may also have another optically anisotropic layer consisting of another polymer not corresponding to the polymerizable liquid crystal compound (I), in addition to the optically anisotropic layer (I).

The phase difference film will be described with reference to a drawing.

FIG. 1 is a schematic cross-sectional view showing an example of the phase difference film included in the image display device of the embodiment of the present invention. Further, the drawings in the present invention are schematic views, and the thickness relationship, the positional relationship, and the like of the respective layers do not always match the actual ones.

A phase difference film 10 shown in FIG. 1 has a positive A-plate 12 and a positive C-plate 14. Incidentally, each of the positive A-plate 12 and the positive C-plate 14 preferably has a single-layer structure.

Furthermore, in the phase difference film 10 shown in FIG. 1, at least the positive A-plate 12 out of the positive A-plate 12 and the positive C-plate 14 is preferably an optically anisotropic layer (I).

Hereinafter, the respective components of the polymerizable liquid crystal composition of the embodiment of the present invention which forms the optically anisotropic layer (I) included in the phase difference film will be described in detail.

(Polymerizable Liquid Crystal Compound (I))

The polymerizable liquid crystal compound (I) is a polymerizable liquid crystal compound represented by Formula (I).

Suitable examples of the linear or branched alkylene group having 1 to 12 carbon atoms represented by each of $SP^1$ and $SP^2$ in Formula (I) include a methylene group, an ethylene group, a propylene group, a butylene group, a pentylene group, a hexylene group, a methylhexylene group, and a heptylene group. Incidentally, $SP^1$ and $SP^2$ may be a divalent linking group in which one or more of $-CH_2-$'s constituting the linear or branched alkylene group having 1 to 12 carbon atoms are substituted with $-O-$, $-S-$, $-NH-$, $-N(Q)-$, or $-CO-$, as described above, and examples of the substituent represented by Q include the same ones as the substituents which may be contained in $Y^1$ in Formula (Ar-1).

In Formula (I), examples of the monovalent organic group represented by each of $L^1$ and $L^2$ include an alkyl group, an aryl group, and a heteroaryl group. The alkyl group may be linear, branched, or cyclic, but is preferably linear. The number of carbon atoms of the alkyl group is preferably 1 to 30, more preferably 1 to 20, and still more preferably 1 to 10. Further, the aryl group may be a monocycle or a polycycle, but is preferably the monocycle. The number of carbon atoms of the aryl group is preferably 6 to 25, and more preferably 6 to 10. Further, the heteroaryl group may be a monocycle or a polycycle. The number of heteroatoms constituting the heteroaryl group is preferably 1 to 3. The heteroatoms constituting the heteroaryl group is preferably a nitrogen atom, a sulfur atom, or an oxygen atom. The number of carbon atoms of the heteroaryl group is preferably 6 to 18, and more preferably 6 to 12. In addition, the alkyl group, the aryl group, and the heteroaryl group may be unsubstituted or have a substituent. Examples of the substituent include the same ones as the substituents which may be contained in $Y^1$ in Formula (Ar-1) which will be described later.

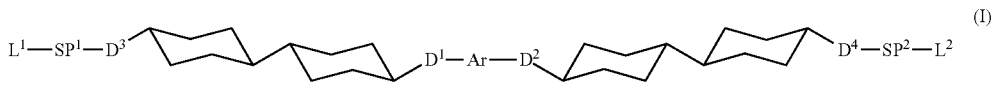

(I)

In addition, in Formula (I), $D^1$, $D^2$, $D^3$, and $D^4$ each independently represent a single bond, $-CO-O-$, $-C(=S)O-$, $-CR^1R^2-$, $-CR^1R^2-CR^3R^4-$, $-O-CR^1R^2-$, $-CR^1R^2-O-CR^3R^4-$, $-CO-O-CR^1R^2-$, $-O-CO-CR^1R^2-$, $-CR^1R^2-O-CO-CR^3R^4-$, $-CR^1R^2-CO-O-CR^3R^4-$, $-NR^1-CR^2R^3-$, or $-CO-NR^1-$. $R^1$, $R^2$, $R^3$, and R each independently represent a hydrogen atom, a fluorine atom, or an alkyl group having 1 to 4 carbon atoms.

Incidentally, in Formula (I), $SP^1$ and $SP^2$ each independently represent a single bond, a linear or branched alkylene group having 1 to 12 carbon atoms, or a divalent linking group in which one or more of $-CH_2-$'s constituting the linear or branched alkylene group having 1 to 12 carbon atoms are substituted with $-O-$, $-S-$, $-NH-$, $-N(Q)-$, or $-CO-$, and Q represents a substituent.

In addition, in Formula (I), $L^1$ and $L^2$ each independently represent a monovalent organic group, and at least one of $L^1$ or $L^2$ represents a polymerizable group. It should be noted that in a case where Ar is an aromatic ring represented by Formula (Ar-3) which will be described later, at least one of $L^1$ or $L^2$, or L or $L^4$ in Formula (Ar-3) represents a polymerizable group.

In Formula (I), the polymerizable group represented by at least one of $L^1$ or $L^2$ is not particularly limited, but is preferably a polymerizable group which is radically polymerizable or cationically polymerizable.

A generally known radically polymerizable group can be used as the radically polymerizable group, and suitable examples thereof include an acryloyl group and a methacryloyl group. In this case, it is known that the acryloyl group generally has a high polymerization rate, and from the viewpoint of improvement of productivity, the acryloyl group is preferable but the methacryloyl group can also be used in the same manner as the polymerizable group.

A generally known cationically polymerizable group can be used as the cationically polymerizable group, and specific examples thereof include an alicyclic ether group, a cyclic acetal group, a cyclic lactone group, a cyclic thioether group, a spiroorthoester group, and a vinyloxy group. Among those, the alicyclic ether group or the vinyloxy group is preferable, and an epoxy group, an oxetanyl group, or the vinyloxy group is particularly preferable.

Particularly preferred examples of the polymerizable group include the following groups.

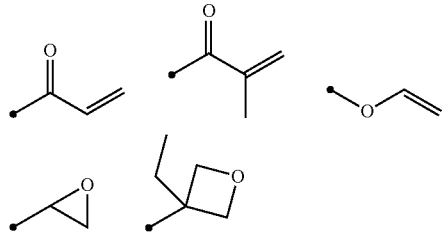

In Formula (I), for a reason that the durability is improved, both of $L^1$ and $L^2$ in Formula (I) are preferably a polymerizable group, and more preferably an acryloyl group or a methacryloyl group.

On the other hand, in Formula (I), Ar represents any aromatic ring selected from the group consisting of groups represented by Formulae (Ar-1) to (Ar-5). Further, in Formulae (Ar-1) to (Ar-5), * represents a bonding position to $D^1$ or $D^2$ in Formula (I).

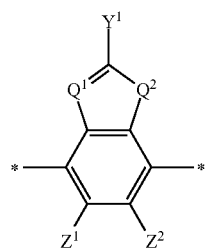
(Ar-1)

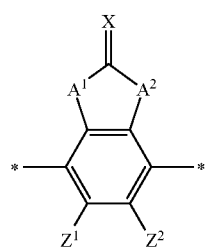
(Ar-2)

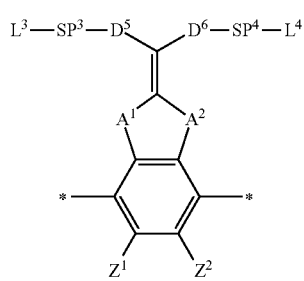
(Ar-3)

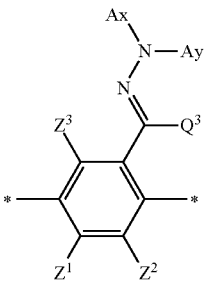
(Ar-4)

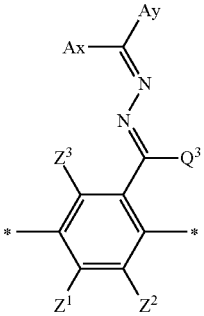
(Ar-5)

Here, in Formula (Ar-1), $Q^1$ represents N or CH, $Q^2$ represents —S—, —O—, or —N(RS)—, RS represents a hydrogen atom or an alkyl group having 1 to 6 carbon atoms, and $Y^1$ represents an aromatic hydrocarbon group having 6 to 12 carbon atoms or an aromatic heterocyclic group having 3 to 12 carbon atoms, each of which may have a substituent.

Specific examples of the alkyl group having 1 to 6 carbon atoms represented by $R^5$ include a methyl group, an ethyl group, a propyl group, an isopropyl group, an n-butyl group, an isobutyl group, a sec-butyl group, a tert-butyl group, an n-pentyl group, and an n-hexyl group.

Examples of the aromatic hydrocarbon group having 6 to 12 carbon atoms represented by $Y^1$ include aryl groups such as a phenyl group, a 2,6-diethylphenyl group, and a naphthyl group.

Examples of the aromatic heterocyclic group having 3 to 12 carbon atoms represented by $Y^1$ include heteroaryl groups such as a thienyl group, a thiazolyl group, a furyl group, and a pyridyl group.

Furthermore, examples of the substituent which may be contained in $Y^1$ include an alkyl group, an alkoxy group, and a halogen atom.

As the alkyl group, for example, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group) is more preferable, an alkyl group having 1 to 4 carbon atoms is still more preferable, and the methyl group or the ethyl group is particularly preferable.

As the alkoxy group, for example, an alkoxy group having 1 to 18 carbon atoms is preferable, an alkoxy group having 1 to 8 carbon atoms (for example, a methoxy group, an ethoxy group, an n-butoxy group, and a methoxy ethoxy group) is more preferable, an alkoxy group having 1 to 4 carbon atoms is still more preferable, and the methoxy group or the ethoxy group is particularly preferable.

Examples of the halogen atom include a fluorine atom, a chlorine atom, a bromine atom, and an iodine atom, and among these, the fluorine atom or the chlorine atom is preferable.

In addition, in Formulae (Ar-1) to (Ar-5), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, —$OR^6$, —$NR^7R^8$, or —$SR^9$, $R^6$ to $R^9$ each independently represent a hydrogen atom or an alky group having 1 to 6 carbon atoms, and $Z^1$ and $Z^2$ may be bonded to each other to form an aromatic ring.

As the monovalent aliphatic hydrocarbon group having 1 to 20 carbon atoms, an alkyl group having 1 to 15 carbon atoms is preferable, an alkyl group having 1 to 8 carbon atoms is more preferable, and specifically, a methyl group, an ethyl group, an isopropyl group, a tert-pentyl group (1,1-dimethylpropyl group), a tert-butyl group, or a 1,1-dimethyl-3,3-dimethyl-butyl group is still more preferable, and the methyl group, the ethyl group, and the tert-butyl group are particularly preferable.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, and a cyclodecadiene; and polycyclic saturated hydrocarbon groups such as a bicyclo[2.2.1]heptyl group, a bicyclo[2.2.2]octyl group, a tricyclo[5.2.1.0$^6$]decyl group, a tricyclo[3.3.1.3$^{,7}$]decyl group, a tetracyclo[6.2.1.1$^{3,6}$.0$^{2,7}$]dodecyl group, and an adamantyl group.

Specific examples of the monovalent aromatic hydrocarbon group having 6 to 20 carbon atoms include a phenyl group, a 2,6-diethylphenyl group, a naphthyl group, and a biphenyl group, and an aryl group having 6 to 12 carbon atoms (particularly a phenyl group) is preferable.

Examples of the halogen atom include a fluorine atom, a chlorine atom, a bromine atom, and an iodine atom, and among these, the fluorine atom, the chlorine atom, or the bromine atom is preferable.

On the other hand, specific examples of the alkyl group having 1 to 6 carbon atoms represented by each of $R^6$ to $R^9$ include a methyl group, an ethyl group, a propyl group, an isopropyl group, an n-butyl group, an isobutyl group, a sec-butyl group, a tert-butyl group, an n-pentyl group, and an n-hexyl group.

In addition, in Formulae (Ar-2) and (Ar-3), $A^1$ and $A^2$ each independently represent a group selected from the group consisting of —O—, —$N(R^{10})$—, —S—, and —CO—, and $R^{10}$ represents a hydrogen atom or a substituent.

Examples of the substituent represented by $R^{10}$ include the same ones as the substituents which may be contained in $Y^1$ in Formula (Ar-1).

Furthermore, in Formula (Ar-2), X represents a hydrogen atom or a non-metal atom of Groups XIV to XVI to which a substituent may be bonded.

Moreover, examples of the non-metal atom of Groups XIV to XVI represented by X include an oxygen atom, a sulfur atom, a nitrogen atom having a substituent, and a carbon atom having a substituent, and specific examples of the substituent include an alkyl group, an alkoxy group, an alkyl-substituted alkoxy group, a cyclic alkyl group, an aryl group (for example, a phenyl group and a naphthyl group), a cyano group, an amino group, a nitro group, an alkylcarbonyl group, a sulfo group, and a hydroxyl group.

In addition, in Formula (Ar-3), $D^5$ and D each independently represent a single bond, —CO—O—, —C(=S)O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—O—CO—$CR^3R^4$—, —$CR^1R^2$—CO—O—$CR^3R$—, —$NR^1$—$CR^2R^3$—, or —CO—$NR^1$—. $R^1$, $R^2$, $R^3$, and $R^4$ each independently represent a hydrogen atom, a fluorine atom, or an alkyl group having 1 to 4 carbon atoms.

Moreover, in Formula (Ar-3), $SP^3$ and $SP^4$ each independently represent a single bond, a linear or branched alkylene group having 1 to 12 carbon atoms, or a divalent linking group in which one or more of —$CH_2$-'s constituting the linear or branched alkylene group having 1 to 12 carbon atoms are substituted with —O—, —S—, —NH—, —N(Q)-, or —CO—, and Q represents a substituent. Examples of the substituent include the same ones as the substituents which may be contained in $Y^1$ in Formula (Ar-1).

Furthermore, in Formula (Ar-3), $L^3$ and $L^4$ each independently represent a monovalent organic group, and at least one of $L^3$ or $L^4$, or $L^1$ or $L^2$ in Formula (I) represents a polymerizable group.

Examples of the monovalent organic group include the same ones as the monovalent organic groups described for $L^1$ and $L^2$ in Formula (I).

In addition, examples of the polymerizable group include the same ones as the polymerizable groups described for $L^1$ and $L^2$ in Formula (I).

Moreover, in Formulae (Ar-4) and (Ar-5), Ax represents an organic group having 2 to 30 carbon atoms, which has at least one aromatic ring selected from the group consisting of an aromatic hydrocarbon ring and an aromatic heterocyclic ring.

Furthermore, in Formulae (Ar-4) and (Ar-5), Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring.

Here, the aromatic rings in each of Ax and Ay may have a substituent, and Ax and Ay may be bonded to each other to form a ring.

In addition, $Q^3$ represents a hydrogen atom, or an alkyl group having 1 to 6 carbon atoms, which may have a substituent.

Examples of each of Ax and Ay include the ones described in paragraphs [0039] to [0095] of WO2014/010325A.

Incidentally, specific examples of the alkyl group having 1 to 6 carbon atoms represented by $Q^3$ include a methyl group, an ethyl group, a propyl group, an isopropyl group, an n-butyl group, an isobutyl group, a sec-butyl group, a tert-butyl group, an n-pentyl group, and an n-hexyl group, and examples of the substituent include the same ones as the substituents which may be contained in $Y^1$ in Formula (Ar-1).

Suitable examples of such a polymerizable liquid crystal compound (I) include compounds represented by Formulae (1) to (12), and specifically, the compounds represented by Formulae (1) to (12), which has side chain structures shown in Tables 1 and 2 below as K (side chain structure).

Furthermore, in Tables 1 and 2 below, "*" shown in the side chain structure of K represents a bonding position to an aromatic ring.

Incidentally, in the following description, a compound represented by Formula (1) and having a group shown in 1-1 in Table 1 below is noted as "Compound (1-1-1)", and compounds having other structural formulae and groups are also noted in the same manner. For example, a compound represented by Formula (2) and having a group shown in 2-3 in Table 2 below can be noted as "Compound (2-2-3)".

In addition, in the side chain structures shown in 1-2 in Table 1 below and 2-2 in Table 2 below, a group adjacent to each of the acryloyloxy group and the methacryloyl group represents a propylene group (a group in which a methyl group is substituted with an ethylene group), and represents a mixture of position isomers in which the positions of the methyl groups are different.

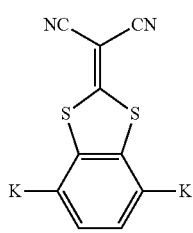
(1)

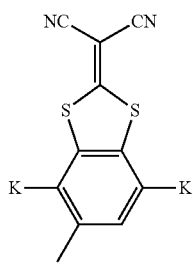
(2)

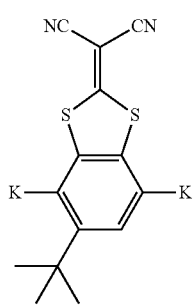
(3)

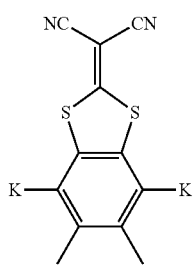
(4)

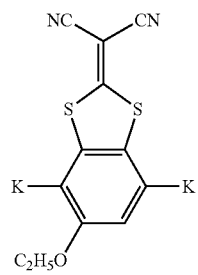
(5)

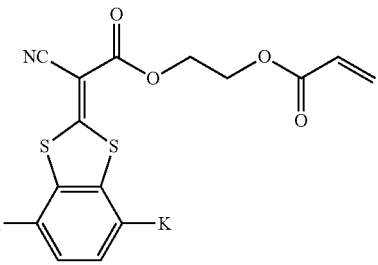
(6)

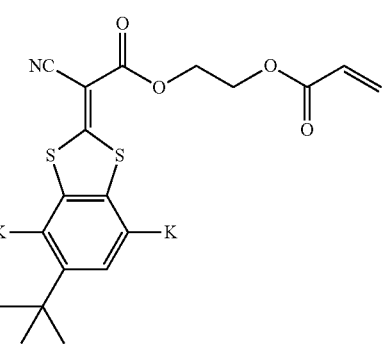
(7)

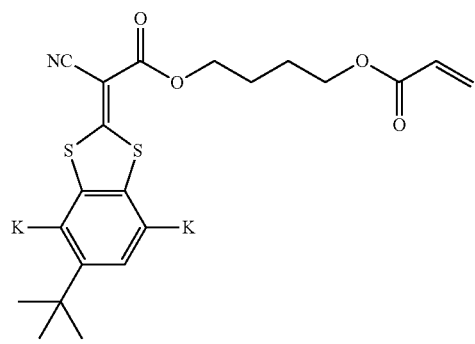
(8)

-continued
(9)
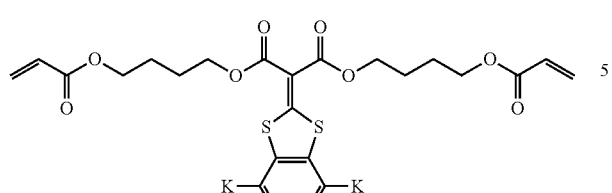
(10)
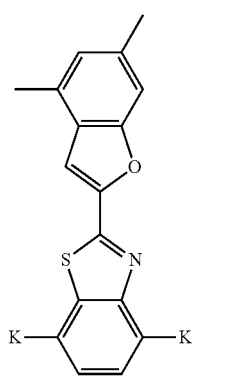
(11)
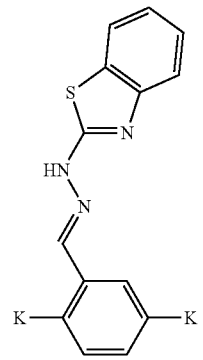
(12)
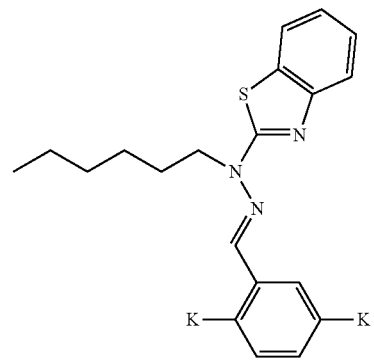
TABLE 1
| | K (side chain structure) |
|---|---|
| 1-1 | 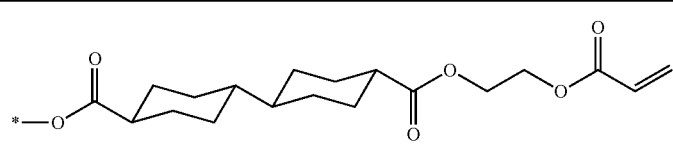 |
| 1-2 | 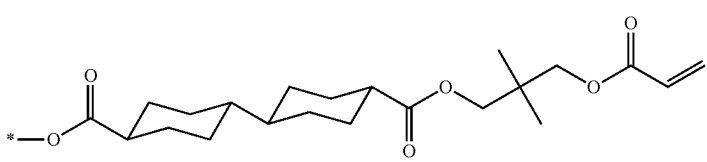 [SMILES: *OC(=O)C1CCC(C2CCC(C(=O)OCC(C)(C)COC(=O)C=C)CC2)CC1] |
| 1-3 | 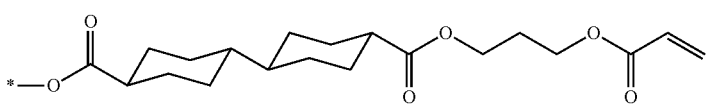 [SMILES: *OC(=O)C1CCC(C2CCC(C(=O)OCCCOC(=O)C=C)CC2)CC1] |
| 1-4 | 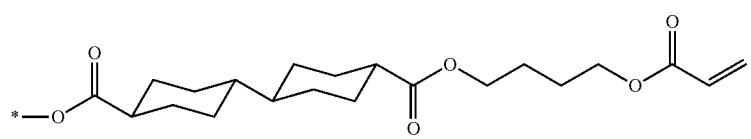 [SMILES: *OC(=O)C1CCC(C2CCC(C(=O)OCCCCOC(=O)C=C)CC2)CC1] |
| 1-5 | 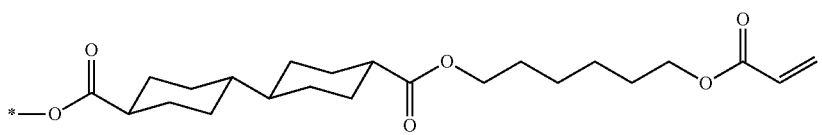 [SMILES: *OC(=O)C1CCC(C2CCC(C(=O)OCCCCCCOC(=O)C=C)CC2)CC1] |

TABLE 1-continued
| | K (side chain structure) |
|---|---|
| 1-6 | 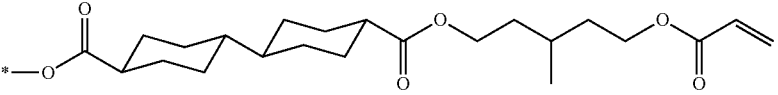 [SMILES: *OC(=O)C1CCC(C2CCC(C(=O)OCCC(C)CCOC(=O)C=C)CC2)CC1] |
| 1-7 | 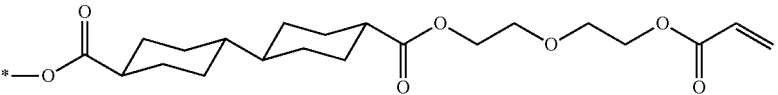 [SMILES: *OC(=O)C1CCC(C2CCC(C(=O)OCCOCCOC(=O)C=C)CC2)CC1] |
| 1-8 | 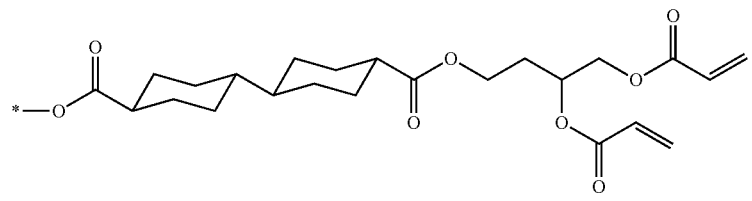 [SMILES: *OC(=O)C1CCC(C2CCC(C(=O)OCCC(COC(=O)C=C)OC(=O)C=C)CC2)CC1] |
| 1-9 | 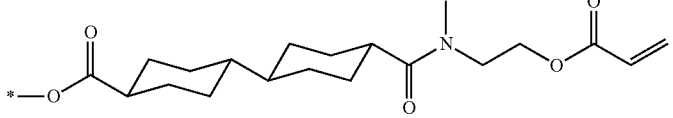 |
| 1-10 | 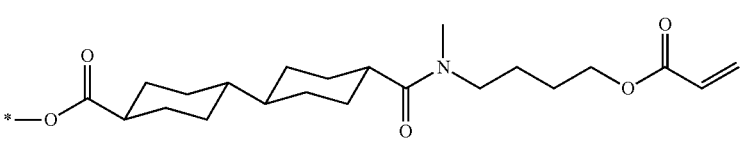 |
| 1-11 | 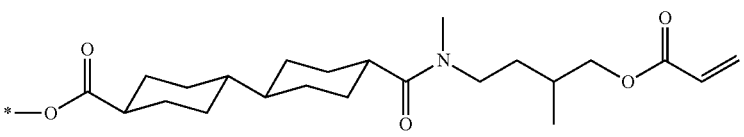 [SMILES: *OC(=O)C1CCC(C2CCC(C(=O)N(C)CCC(C)COC(=O)C=C)CC2)CC1] |
| 1-12 | 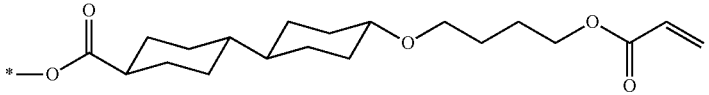 [SMILES: *OC(=O)C1CCC(C2CCC(OCCCCOC(=O)C=C)CC2)CC1] |
| 1-13 | 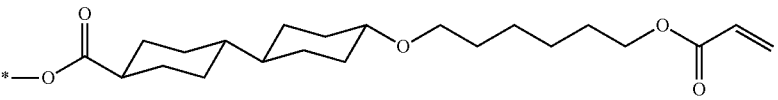 [SMILES: *OC(=O)C1CCC(C2CCC(OCCCCCCOC(=O)C=C)CC2)CC1] |
| 1-14 |  |
TABLE 2
| | K (side chain structure) |
|---|---|
| 2-1 | 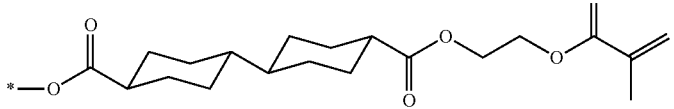 |

TABLE 2-continued
| K (side chain structure) | |
|---|---|
| 2-2 | 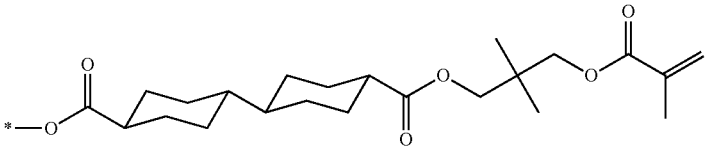 [SMILES: *OC(=O)C1CCC(C2CCC(C(=O)OCC(C)(C)COC(=O)C(=C)C)CC2)CC1] |
| 2-3 | 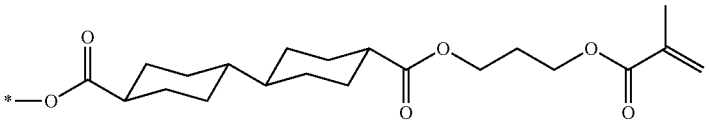 [SMILES: *OC(=O)C1CCC(C2CCC(C(=O)OCCCOC(=O)C(=C)C)CC2)CC1] |
| 2-4 | 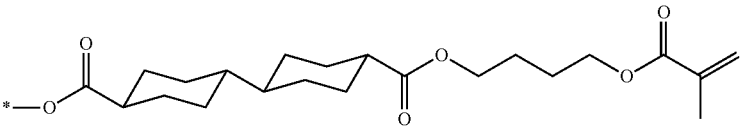 [SMILES: *OC(=O)C1CCC(C2CCC(C(=O)OCCCCOC(=O)C(=C)C)CC2)CC1] |
| 2-5 | 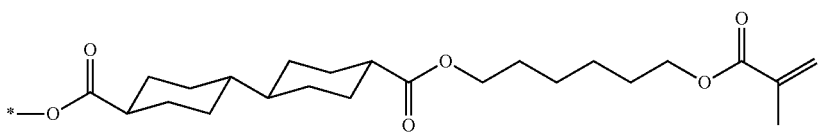 [SMILES: *OC(=O)C1CCC(C2CCC(C(=O)OCCCCCCOC(=O)C(=C)C)CC2)CC1] |
| 2-6 | 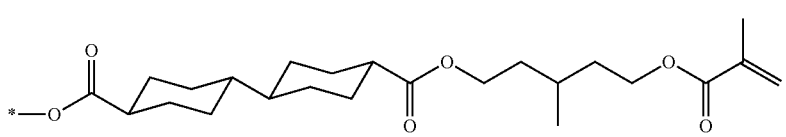 [SMILES: *OC(=O)C1CCC(C2CCC(C(=O)OCCC(C)CCOC(=O)C(=C)C)CC2)CC1] |
| 2-7 | 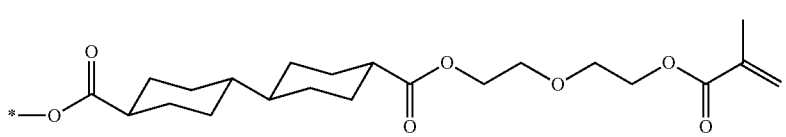 [SMILES: *OC(=O)C1CCC(C2CCC(C(=O)OCCOCCOC(=O)C(=C)C)CC2)CC1] |
| 2-8 | 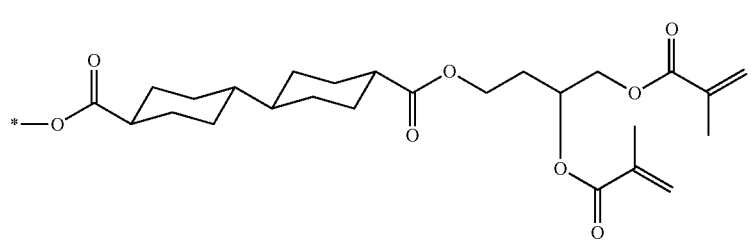 [SMILES: *OC(=O)C1CCC(C2CCC(C(=O)OCCC(COC(=O)C(=C)C)OC(=O)C(=C)C)CC2)CC1] |
| 2-9 | 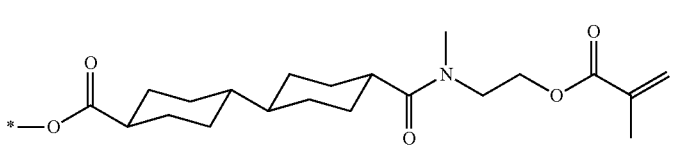 [SMILES: *OC(=O)C1CCC(C2CCC(C(=O)N(C)CCOC(=O)C(=C)C)CC2)CC1] |
| 2-10 | 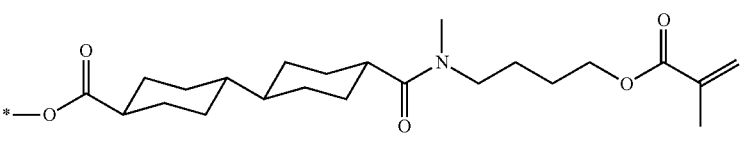 [SMILES: *OC(=O)C1CCC(C2CCC(C(=O)N(C)CCCCOC(=O)C(=C)C)CC2)CC1] |
| 2-11 | 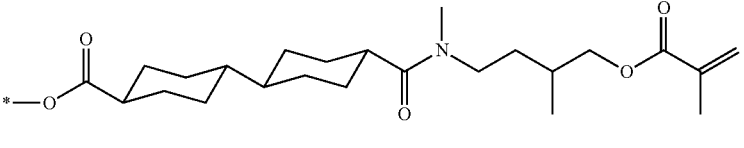 [SMILES: *OC(=O)C1CCC(C2CCC(C(=O)N(C)CCC(C)COC(=O)C(=C)C)CC2)CC1] |

TABLE 2-continued

K (side chain structure)

2-12

[Chemical structure]

2-13

[Chemical structure]

2-14

[Chemical structure]

In the present invention, for a reason that the display performance is improved even after being exposed to a moisture-heat environment, at least one kind of the polymerizable liquid crystal compound represented by Formula (I) is preferably a compound having a van der Waals volume of $Z^1$ or $Z^2$ contained in Ar in Formula (I) of $0.3 \times 10^2$ Å$^3$ or more, and for a reason that the retardation per film thickness of an optically anisotropic layer thus formed is increased, at least one kind of the polymerizable liquid crystal compound represented by Formula (I) is more preferably a compound having the van der Waals volume of $0.5 \times 10^2$ Å$^3$ to $1.5 \times 10^2$ Å$^3$.

Here, the "van der Waals volume" refers to a volume of an area occupied by the van der Waals sphere based on the van der Waals radii of atoms constituting a substituent, and is a value calculated using the values and the method described in the "Journal of Japanese Chemistry, extra number 122; "Structure Activity Relationship of Drugs (Guidelines for Drug Design and Study on Mechanism of Action," pp. 134 to 136, 1979, Nankodo", and for example, the van der Waals volume of a hydrogen atom can be calculated as $0.06 \times 10^2$ Å$^3$, and the van der Waals volume of a methyl group can be calculated as $0.25 \times 10^2$ Å$^3$, and the van der Waals volume of a tert-butyl group can be calculated as $0.71 \times 10^2$ Å$^3$.

In addition, a unit of the van der Waals volume (Å$^3$) can be converted into an SI unit with 1 Å$^3$=10-3 nm$^3$.

In the present invention, for a reason that the synthesis is easily performed and the light resistance of an optically anisotropic layer thus formed is improved, it is preferable that Ar in Formula (I) is a group represented by Formula (Ar-2), and specifically, it is more preferable that A$^1$ and A$^2$ in Formula (Ar-2) each represent —S—, and X in Formula (Ar-2) represents a group representing a carbon atom to which two cyano groups are bonded.

In the present invention, for a reason that the display performance is improved even after being exposed to a moisture-heat environment, an I/O value of the liquid crystal compound included in the polymerizable liquid crystal composition of the embodiment of the present invention is preferably 0.51 or less, and more preferably 0.43 to 0.50 as a weighted average value. Further, the liquid crystal compound for which the I/O value is to be determined is not limited to the polymerizable liquid crystal compound represented by Formula (I), but is be any of the liquid crystal compounds included in the polymerizable liquid crystal composition of the embodiment of the present invention.

Here, the "I/O value" is used as one unit for predicting various physicochemical properties of an organic compound. The magnitude of organicity is obtained by comparison of the number of carbon atoms and the magnitude of inorganicity is obtained by comparison of the boiling points of the same number of hydrocarbons as the number of carbon atoms. For example, the organicity value of one (—CH$_2$—) (actually C) is determined as 20 and the inorganicity value is determined as 100 from an influence of a hydroxyl group (—OH) on the boiling point. Based on the inorganicity value of (—OH) of 100, values of other substituents (inorganic groups) are obtained, which is shown as an "Inorganic group table". According to the inorganic group table, the ratio I/O of inorganicity (I) value and organicity (O) value obtained for each molecule is defined as "I/O value". It is shown that the larger the I/O value, the higher the hydrophilicity thereof, and the smaller the I/O value, the stronger the hydrophobicity.

In the present invention, the "I/O value" is a value of "inorganicity (I)/organicity (O)" obtained by a method described in "YOSHIO KOUDA et al., "New edition Organic Conceptual Diagram Foundation and Application", November 2008, SANKYO PUBLISHING".

(Polyfunctional Polymerizable Monomer)

For a reason that the optically anisotropic layer is firmly aggregated and the moisture-heat resistance is further increased, it is preferable that the polymerizable liquid crystal composition of the embodiment of the present invention contains a polymerizable compound (polyfunctional polymerizable monomer) not corresponding to Formula (I) and having two or more polymerizable groups.

The polyfunctional polymerizable monomer is preferably a polyfunctional radical polymerizable monomer. Specific examples of the polyfunctional radical polymerizable monomer include the polymerizable monomers described in paragraphs [0018] to [0020] of JP2002-296423A.

In addition, in a case where a polyfunctional polymerizable monomer is contained, a content thereof is preferably 1% to 50% by mass, and more preferably 2% to 30% by mass, with respect to a total mass of the liquid crystal compound.

(Polymerization Initiator)

The polymerizable liquid crystal composition of the embodiment of the present invention preferably contains a polymerization initiator.

The polymerization initiator to be used is preferably a photopolymerization initiator capable of initiating a polymerization reaction upon irradiation with ultraviolet rays.

Examples of the photopolymerization initiator include α-carbonyl compounds (described in each of the specifications of U.S. Pat. Nos. 2,367,661A and 2,367,670A), acyloin ethers (described in the specification of U.S. Pat. No. 2,448,828A), α-hydrocarbon-substituted aromatic acyloin compounds (described in the specification of U.S. Pat. No. 2,722,512A), multinuclear quinone compounds (described in each of the specifications of U.S. Pat. Nos. 3,046,127A and 2,951,758A), combinations of a triarylimidazole dimer and a p-aminophenyl ketone (described in the specification of U.S. Pat. No. 3,549,367A), acridine and phenazine compounds (described in JP1985-105667A (JP-S60-105667A) and the specification of U.S. Pat. No. 4,239,850A), oxadiazole compounds (described in the specification of U.S. Pat. No. 4,212,970A), and acyl phosphine oxide compounds (described in JP1988-040799B (JP-S63-040799B), JP1993-029234B (JP-H05-029234B), JP1998-095788A (JP-H10-095788A), and JP1998-029997A (JP-H10-029997A)).

In the present invention, for a reason that the display performance is improved even after being exposed to a moisture-heat environment, the polymerization initiator is preferably an oxime-type polymerization initiator, and specifically, it is more preferably a polymerization initiator represented by Formula (2).

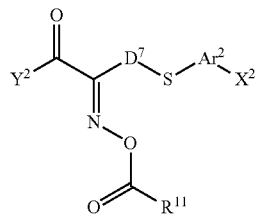

(2)

In Formula (2), $X^2$ represents a hydrogen atom or a halogen atom.

Furthermore, in Formula (2), $Ar^2$ represents a divalent aromatic group and $D^7$ represents a divalent organic group having 1 to 12 carbon atoms.

In addition, in Formula (2), $R^{11}$ represents an alkyl group having 1 to 12 carbon atoms and $Y^2$ represents a monovalent organic group.

In Formula (2), examples of the halogen atom represented by $X^2$ include a fluorine atom, a chlorine atom, a bromine atom, and an iodine atom, and among these, the chlorine atom is preferable.

Furthermore, in Formula (2), examples of the divalent aromatic group represented by $Ar^2$ include divalent groups having an aromatic hydrocarbon ring such as a benzene ring, a naphthalene ring, an anthracene ring, and a phenanthroline ring; and divalent groups having an aromatic heterocyclic ring such as a furan ring, a pyrrole ring, a thiophene ring, a pyridine ring, a thiazole ring, and a benzothiazole ring.

Incidentally, in Formula (2), examples of the divalent organic group having 1 to 12 carbon atoms represented by $D^7$ include a linear or branched alkylene group having 1 to 12 carbon atoms, and specific suitable examples thereof include a methylene group, an ethylene group, and a propylene group.

Moreover, in Formula (2), specific suitable examples of the alkyl group having 1 to 12 carbon atoms represented by $R^{11}$ include a methyl group, an ethyl group, and a propyl group.

In addition, in Formula (2), examples of the monovalent organic group represented by $Y^2$ include a functional group including a benzophenone skeleton $((C_6H_5)_2CO)$. Specifically, in a similar manner to the groups represented by Formula (2a) and Formula (2b), a functional group including a benzophenone skeleton in which a benzene ring at a terminal is unsubstituted or mono-substituted is preferable.

Further, in Formula (2a) and Formula (2b), * represents a bonding position, that is, a bonding position to the carbon atom of the carbonyl group in Formula (2).

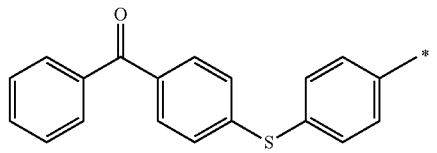

(2a)

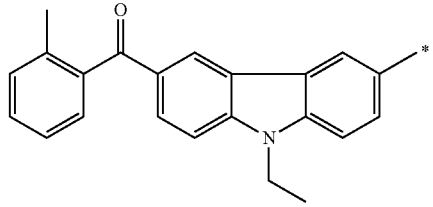

(2b)

Examples of the oxime-type polymerization initiator represented by Formula (2) include a compound represented by Formula S-1 and a compound represented by Formula S-2.

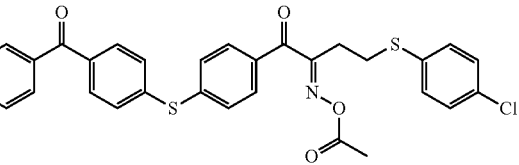

S-1

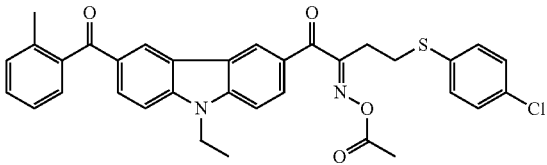 [SMILES: CC(=O)O/N=C(\CCSc1ccc(Cl)cc1)C(=O)c1ccc(Sc2ccc(C(=O)c3ccccc3)cc2)cc1]

S-2

In the present invention, the content of the polymerization initiator is not particularly limited, but is preferably 0.01% to 20% by mass, and more preferably 0.5% to 5% by mass of the solid content of the polymerizable liquid crystal composition.

(Solvent)

It is preferable that the polymerizable liquid crystal composition of the embodiment of the present invention contains a solvent from the viewpoint of workability for forming an optically anisotropic layer, and the like.

Specific examples of the solvent include ketones (for example, acetone, 2-butanone, methyl isobutyl ketone, cyclohexanone, and cyclopentanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide), and these may be used singly or in combination of two or more kinds thereof.

(Leveling Agent)

It is preferable that the polymerizable liquid crystal composition of the embodiment of the present invention contains a leveling agent from the viewpoint that the surface of an optically anisotropic layer is maintained smooth and the alignment is easily controlled.

Such a leveling agent is preferably a fluorine-based leveling agent or a silicon-based leveling agent for a reason that it has a high leveling effect on the addition amount, and the leveling agent is more preferably a fluorine-based leveling agent from the viewpoint that it is less likely to cause bleeding (bloom or bleed).

Specific example of the leveling agent include the compounds described in paragraphs [0079] to [0102] of JP2007-069471A, the compound represented by General Formula (I) described in JP2013-047204A (in particular, the compounds described in paragraphs [0020] to [0032]), the compound represented by General Formula (I) described in JP2012-211306A (in particular, the compounds described in paragraphs [0022] to [0029]), the liquid crystal alignment accelerator represented by General Formula (I) described in JP2002-129162A (in particular, the compounds described in paragraphs [0076] to [0078] and [0082] to [0084]), and the compounds represented by General Formulae (I), (II), and (III) described in JP2005-099248A (in particular, the compounds described in paragraphs [0092] to In addition, the leveling agent may also function as an alignment control agent which will be described later.

(Alignment Control Agent)

The polymerizable liquid crystal composition of the embodiment of the present invention can contain an alignment control agent, as desired.

With the alignment control agent, various alignment states such as homeotropic alignment (vertical alignment), tilt alignment, hybrid alignment, and cholesteric alignment can be formed, in addition to the homogeneous alignment, and specific alignment states can be controlled and achieved more uniformly and more accurately.

As an alignment control agent which accelerates the homogeneous alignment, for example, a low-molecular-weight alignment control agent or a high-molecular-weight alignment control agent can be used.

With regard to the low-molecular-weight alignment control agent, reference can be made to the description in, for example, paragraphs [0009] to [0083] of JP2002-020363A, paragraphs [0111] to [0120] of JP2006-106662A, and paragraphs [0021] to [0029] of JP2012-211306A, the contents of which are hereby incorporated by reference.

In addition, with regard to the high-molecular-weight alignment control agent, reference can be made to the description in, for example, paragraphs [0021] to [0057] of JP2004-198511A and paragraphs [0121] to [0167] of JP2006-106662A, the contents of which are hereby incorporated by reference.

Furthermore, examples of the alignment control agent that forms or accelerates the homeotropic alignment include a boronic acid compound and an onium salt compound, and specifically, reference can be made to the compounds described in paragraphs [0023] to [0032] of JP2008-225281A, paragraphs [0052] to [0058] of JP2012-208397A, paragraphs [0024] to [0055] of JP2008-026730A, paragraphs [0043] to [0055] of JP2016-193869A, and the like, the contents of which are hereby incorporated by reference.

On the other hand, the cholesteric alignment can be achieved by adding a chiral agent to the polymerizable liquid crystal composition of the embodiment of the present invention, and it is possible to control the direction of revolution of the cholesteric alignment by its chiral direction. Incidentally, it is possible to control the pitch of the cholesteric alignment in accordance with the alignment regulating force of the chiral agent.

In a case where an alignment control agent is contained, a content thereof is preferably 0.01% to 10% by mass, and more preferably 0.05% to 5% by mass, with respect to the mass of the total solid content of the polymerizable liquid crystal composition. In a case where the content is within the range, it is possible to obtain an optically anisotropic layer which has no precipitation or phase separation, alignment defects, or the like, and is homogenous and highly transparent while achieving a desired alignment state.

These alignment control agents can further impart a polymerizable functional group, in particular, a polymerizable functional group which is polymerizable with a polymerizable liquid crystal compound constituting the polymerizable liquid crystal composition of the embodiment of the present invention.

(Other Components)

The polymerizable liquid crystal composition of the embodiment of the present invention may contain components other than the above-mentioned components, and examples of such other components include a liquid crystal compound other than the above-mentioned polymerizable liquid crystal compound, a surfactant, a tilt angle control agent, an alignment aid, a plasticizer, and a crosslinking agent.

(Formation Method)

A method for forming the optically anisotropic layer (I) using the above-mentioned polymerizable liquid crystal composition of the embodiment of the present invention is not particularly limited, and examples thereof include a method in which the above-mentioned polymerizable liquid crystal composition of the embodiment of the present invention is used to cause a desired alignment state, which is then fixed by polymerization.

Here, the polymerization conditions are not particularly limited, but in the polymerization by irradiation with light, ultraviolet rays are preferably used. The irradiation dose is preferably 10 $mJ/cm^2$ to 50 $J/cm^2$, more preferably 20 $mJ/cm^2$ to 5 $J/cm^2$, still more preferably 30 $mJ/cm^2$ to 3 $J/cm^2$, and particularly preferably 50 to 1,000 $mJ/cm^2$. In addition, the polymerization may be carried out under a heating condition in order to accelerate the polymerization reaction.

In the present invention, the thickness of the optically anisotropic layer (I) is not particularly limited, but is preferably 0.1 to 10 μm, and more preferably 0.5 to 5 μm.

In the present invention, the optically anisotropic layer (I) preferably satisfies Formula (II).

$$0.50 < Re(450)/Re(550) < 1.00 \qquad (II)$$

Here, in Formula (II), Re(450) represents an in-plane retardation of the optically anisotropic layer at a wavelength of 450 nm, and Re(550) represents an in-plane retardation of the optically anisotropic layer at a wavelength of 550 nm. In addition, in the present specification, in a case where the measurement wavelength of the retardation is not specified, the measurement wavelength is 550 nm.

Furthermore, the values of the in-plane retardation and the thickness-direction retardation refer to values measured with light at the measurement wavelength using AxoScan OPMF-1 (manufactured by Opto Science, Inc.).

Specifically, by inputting the average refractive index ((Nx+Ny+Nz)/3) and the film thickness (d (μm)) to AxoScan OPMF-1, it is possible to calculate:

Slow axis direction (°)
Re(λ)=R0(λ)
Rth(λ)=((nx+ny)/2−nz)×d.

In addition, R0(λ) is expressed in a numerical value calculated with AxoScan OPMF-1, but means Re(λ).

In the present invention, the optically anisotropic layer (I) is preferably λ/4 plate.

Here, the "λ/4 plate" is a plate having a λ/4 function, specifically, a plate having a function of converting a linearly polarized light at a certain specific wavelength into a circularly polarized light (or converting a circularly polarized light to a linearly polarized light).

Further, the expression, "the optically anisotropic layer (I) is a λ/4 plate", means that the optically anisotropic layer (I) is a positive A-plate.

Here, the positive A-plate is defined as follows.

In a case where a refractive index in a film in-plane slow axis direction (in a direction in which an in-plane refractive index is maximum) is defined as nx, a refractive index in an in-plane direction perpendicular to the in-plane slow axis is defined as ny, and a refractive index in a thickness direction is defined as nz, the positive A-plate satisfies the relationship of Formula (A1). In addition, Rth of the positive A-plate indicates a positive value.

$$nx > ny \approx nz \qquad \text{Formula (A1)}$$

Furthermore, the symbol, "≈", encompasses not only a case where the both are completely the same as each other but also a case where the both are substantially the same as each other. The expression, "substantially the same", means that for example, a case where (ny−nz)×d (in which d is the thickness of a film) is −10 to 10 nm, and preferably −5 to 5 nm is also included in "ny≈nz", and a case where (nx−nz)×d is −10 to 10 nm, and preferably −5 to 5 nm is also included in "nx≈nz".

In addition, in a case where the optically anisotropic layer (I) is a λ/4 plate (positive A-plate), an angle between the slow axis of the λ/4 plate and the absorption axis of a linear polarizer which will be described later is preferably 30° to 60°, more preferably 40° to 50°, still more preferably 42° to 48° and particularly preferably 45°.

Here, the "slow axis" of the λ/4 plate means a direction in which the refractive index in the plane of the λ/4 plate is maximum, and the "absorption axis" of the linear polarizer means a direction in which the absorbance is highest.

Further, in a case where the optically anisotropic layer (I) is a λ/4 plate (positive A-plate), it is preferable that the phase difference film further has a positive C-plate from the viewpoint of optical compensation.

Here, the positive C-plate is defined as follows.

The positive C-plate satisfies the relationship of Formula (C). Further, in the positive C-plate, Rth indicates a negative value.

$$nz > nx \approx ny \qquad \text{Formula (C1)}$$

Furthermore, the symbol, "≈", encompasses not only a case where the both are completely the same as each other but also a case where the both are substantially the same as each other. The expression, "substantially the same" includes, for example, a case where (nx−ny)×d (in which d is the thickness of a film) is 0 to 10 nm, and preferably 0 to 5 nm is also included in "nx≈ny".

Such a positive C-plate is not particularly limited, and for example, a stretched film, a liquid crystal layer in which a polymerizable rod-like liquid crystal compound is vertically aligned, or the like can be used, but in the present invention, the positive C-plate is preferably an optically anisotropic layer in which the polymerizable liquid crystal compound (I) is vertically aligned using the above-mentioned polymerizable liquid crystal composition of the embodiment of the present invention.

On the other hand, in the present invention, an aspect in which the optically anisotropic layer (I) is a positive C-plate and the phase difference film further has a λ/4 plate is also available.

Here, suitable examples of the λ4 plate include a layer formed by fixing a liquid crystal compound having a polymerizable group (a rod-like liquid crystal compound or a discotic liquid crystal compound) by polymerization or the like. Further, after the fixed layer is formed, it is no longer necessary to exhibit liquid crystallinity.

At this time, in a case where a rod-like liquid crystal compound is used, it is preferable that the rod-like liquid crystal compound is fixed in a horizontally aligned state, and in a case where a discotic liquid crystalline compound is used, it is preferable that the discotic liquid crystalline compound is fixed in a vertically aligned state.

Incidentally, in the present invention, the expression, "the md-like liquid crystalline compound is horizontally aligned", indicates that the director of the rod-like liquid crystalline compound is parallel to the layer surface, and the expression, "the discotic liquid crystalline compound is vertically aligned", indicates that the disc surface of the discotic liquid crystalline compound is vertical to the layer surface. It is not required to be strictly horizontal and vertical, but shall mean±20° from the exact angle, respectively. It is preferably within 5°, more preferably within ±3°, further preferably within 2°, and most preferably within 1°.

(Support)

The phase difference film included in the circularly polarizing plate may have a support as a base material for forming the optically anisotropic layer (I).

Such a support is preferably transparent, and specifically, it preferably has a light transmittance of 80% or more.

Examples of such a support include a glass substrate and a polymer film, and examples of the material for the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

In addition, an aspect in which the above-mentioned linear polarizer also functions as such a support is also available.

In the present invention, the thickness of the support is not particularly limited, but is preferably 5 to 60 μm, and more preferably 5 to 30 μm.

(Alignment Film)

In a case where the phase difference film included in the circularly polarizing plate has any of the above-mentioned supports, it is preferable that the optical film has an alignment film between the support and the optically anisotropic layer. Further, an aspect in which the above-mentioned support may also function as an alignment film is also available.

The alignment film generally has a polymer as a main component. The materials for the polymer material for an alignment film are described in many documents, and many commercially available products can be used.

The polymer material used in the present invention is preferably a polyvinyl alcohol or a polyimide, or a derivative thereof. Particularly, a modified or non-modified polyvinyl alcohol is preferable.

Examples of the alignment film that can be used in the present invention include the alignment films described for Line 24 on Page 43 to Line 8 on Page 49 of WO01/088574A; the modified polyvinyl alcohols described in paragraphs [0071] to [0095] of JP3907735B; and the liquid crystal alignment film formed by a liquid crystal aligning agent described in JP2012-155308A.

In the present invention, for a reason that it is possible to prevent deterioration in the surface condition by avoiding a contact with the surface of an alignment film upon formation of the alignment film, a photo-alignment film is also preferably used as the alignment film.

The photo-alignment film is not particularly limited, but the polymer materials such as a polyamide compound and a polyimide compound, described in paragraphs [0024] to [0043] of WO2005/096041A; the liquid crystal alignment film formed by a liquid crystal aligning agent having a photo-alignment group, described in JP2012-155308A; LPP-JP265CP, trade name, manufactured by Rolic Technologies Ltd.; or the like can be used.

In addition, in the present invention, the thickness of the alignment film is not particularly limited, but from the viewpoint of forming an optically anisotropic layer having a uniform film thickness by alleviating the surface roughness that can be present on the support, the thickness is preferably 0.01 to 10 μm, more preferably 0.01 to 1 sm, and still more preferably 0.01 to 0.5 μm.

Figure 2:
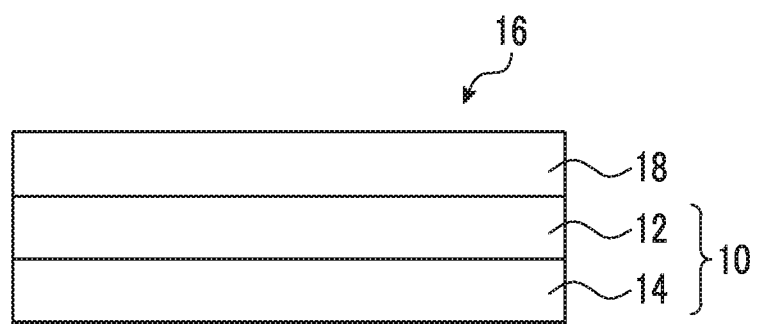
FIG. 2 is a schematic cross-sectional view showing an example of a circularly polarizing plate included in the image display device of the embodiment of the present invention.

The circularly polarizing plate having the linear polarizer and the phase difference film as described above will be described with reference to the drawings. FIG. 2 is a schematic cross-sectional view showing an example of a circularly polarizing plate included in the image display device of the embodiment of the present invention.

A circularly polarizing plate 16 shown in FIG. 2 includes a linear polarizer 18, a positive A-plate 12, and a positive C-plate 14 in this order. In addition, in FIG. 2, in the circularly polarizing plate 16, the linear polarizer 18, the positive A-plate 12, and the positive C-plate 14 are arranged in this order, but the arrangement is not limited to this mode, and for example, the linear polarizer, the positive C-plate, and the positive A-plate may be arranged in this order.

Figure 3:
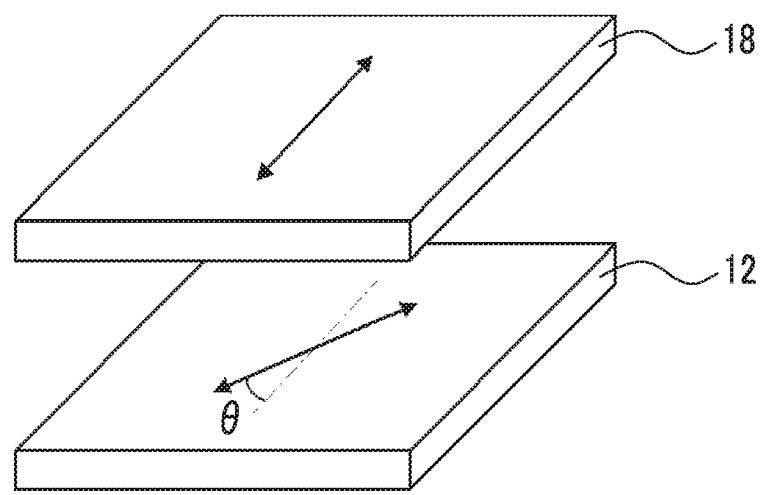
FIG. 3 is a view showing a relationship between the absorption axis of a linear polarizer and the in-plane slow axis of a positive A-plate in the circularly polarizing plate included in the image display device of the embodiment of the present invention.

Furthermore, FIG. 3 shows a relationship between the absorption axis of the linear polarizer and the in-plane slow axis of the positive A-plate in the circularly polarizing plate included in the image display device of the embodiment of the present invention. In FIG. 3, the arrow in the linear polarizer 18 indicates the direction of the absorption axis, and the arrow in the positive A-plate 12 indicates the direction of the in-plane slow axis in the layer. In addition, in FIG. 3, the description of the positive C-plate 14 is omitted.

[Image Display Panel]

An image display panel (display element) included in the image display device of the embodiment of the present invention is not particularly limited, and examples thereof include a liquid crystal cell, an organic electroluminescent (hereinafter simply referred to as "EL") display panel, and a plasma display panel.

Among those, the liquid crystal cell and the organic EL display panel are preferable, and the organic EL display panel is more preferable. That is, as the image display device of the embodiment of the present invention, a liquid crystal display device using a liquid crystal cell as a display element or an organic EL display device using an organic EL display panel as a display element is preferable, and the organic EL display device is more preferable.

Figure 4:
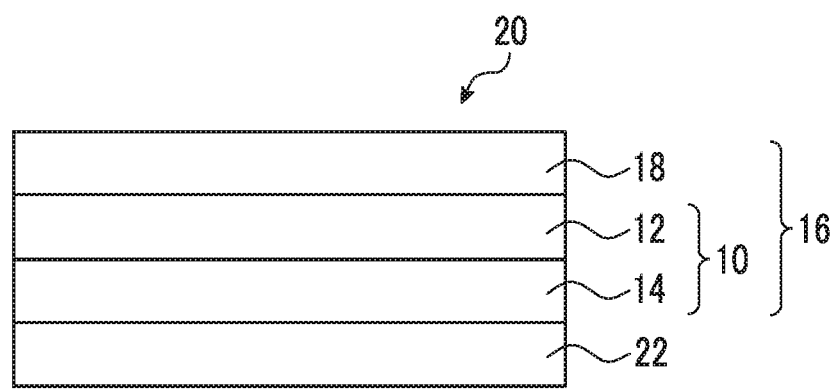
FIG. 4 is a schematic cross-sectional view showing an example of an organic electroluminescent display device which is one mode of the image display device of the embodiment of the present invention.

The organic EL display device will be described with reference to a drawing. FIG. 4 is a schematic cross-sectional view showing an example of an organic EL display device which is an embodiment of the image display device of the embodiment of the present invention.

The organic EL display device 20 shown in FIG. 4 has a linear polarizer 18, a positive A-plate 12, a positive C-plate 14, and an organic EL display panel 22 in this order. In addition, as shown in FIG. 4, the linear polarizer 18 in a circularly polarizing plate 16 is arranged on the viewing side.

Furthermore, the organic EL display panel 22 is a display panel constituted with an organic EL element in which an organic light emitting layer (organic electroluminescent layer) is sandwiched between electrodes (between a cathode and an anode).

The configuration of the organic EL display panel 22 is not particularly limited but a known configuration is adopted.

[Circularly Polarizing Plate with Photosensitive Adhesive]

The circularly polarizing plate with a photosensitive adhesive of an embodiment of the present invention is a circularly polarizing plate with a photosensitive adhesive, which has a linear polarizer, a phase difference film, and a pressure-sensitive adhesive layer in this order.

Here, the phase difference film has an optically anisotropic layer (I) obtained by polymerizing a polymerizable liquid crystal composition containing at least one kind of polymerizable liquid crystal compound (I) represented by Formula (I), and is the same as described for the image display device of the embodiment of the present invention.

In addition, the pressure-sensitive adhesive layer is a layer containing a polymer having an acid value of 1 to 30 mgKOH/g and an antistatic agent, and is a layer consisting of the adhesive as described for the image display device of the embodiment of the present invention.

EXAMPLES

Hereinafter, the features of the present invention will be described in more details with reference to Examples and Comparative Examples. The materials, the amounts of materials used, the proportions, the treatment details, the treatment procedure, and the like shown in Examples below can be appropriately modified as long as the modifications do not depart from the spirit of the present invention. Therefore, the scope of the present invention should not be construed as being limited to specific examples shown below.

Synthesis of Acryl Resin

Polymerization Example 1

A mixed solution of 81.8 parts by mass of ethyl acetate, 70.4 parts by mass of butyl acrylate, 20.0 parts by mass of methyl acrylate, 8.0 parts by mass of 2-phenoxyethyl acrylate, 1.0 part by mass of 2-hydroxyethyl acrylate, and 0.6 parts by mass of acrylic acid was charged into a reaction vessel equipped with a cooling pipe, a nitrogen introduction pipe, a thermometer, and a stirrer, the inside of an apparatus was replaced with a nitrogen gas to be oxygen-free, and the internal temperature was elevated to 55° C.

Thereafter, a whole amount of a solution prepared by dissolving 0.14 parts by mass of azobisisobutyronitrile as a polymerization initiator in 10 parts by mass of ethyl acetate was added thereto. One hour after the addition of the initiator, the mixture was warmed at an internal temperature of 54° C. to 56° C. for 12 hours while ethyl acetate was continuously added into the reaction vessel at an addition rate of 17.3 parts by mass/hr so that the concentration of the acryl resin was 35%, and finally, ethyl acetate was added thereto to adjust the concentration of the acryl resin to 20%. The obtained acryl resin had a weight-average molecular weight Mw and Mw/Mn in terms of polystyrene by GPC of 1,420,000 and 5.2, respectively. This is taken as an acryl resin A.

<Polymerization Example 2>

An acryl resin was produced by the same method as in Polymerization Example 1, except that the monomer formulation was changed to 88.6 parts by mass of butyl acrylate, 10.0 parts by mass of 2-methoxyethyl acrylate, and 1.0 part by mass of 2-hydroxyethyl acrylate. The obtained acryl resin had a weight-average molecular weight Mw and Mw/Mn in terms of polystyrene by GPC of 1,760,000 and 4.9, respectively. This is taken as an acryl resin B.

[Preparation of Pressure-Sensitive Adhesive (Pressure-Sensitive Adhesive Composition)]

N-Hexyl-4-methylpyridinium bis(trifluoromethanesulfonyl)imide (Hex-MPy TFMSI) as an antistatic agent and Coronate L (a solution (solid content: 75%) of a trimethylolpropane adduct of tolylene diisocyanate in ethyl acetate, manufactured by Nippon Polyurethane Co., Ltd., as a crosslinking agent with respect to 100 parts by mass of the solid contents of the acryl resins A and B produced in Polymerization Examples 1 and 2 were mixed in the amounts shown in Table 3 below, and ethyl acetate was added thereto so that the solid content was 13%, thereby obtaining a pressure-sensitive adhesive composition.

TABLE 3

|  | Pressure-sensitive adhesive 1 | Pressure-sensitive adhesive 2 | Pressure-sensitive adhesive 3 |
| --- | --- | --- | --- |
| Acryl resin | A | B | A |
| Acid value (mgKOH/g) | 3.5 | 0.0 | 3.5 |
| Antistatic agent | Hex-MPy TFMSI | Hex-MPy TFMSI | None |
| Blending amount | 3 parts by mass | 3 parts by mass | — |
| Crosslinking agent | Coronate L | Coronate L | Coronate L |
| Blending amount | 0.5 parts by mass | 0.5 parts by mass | 0.5 parts by mass |

The pressure-sensitive adhesives (pressure-sensitive adhesive compositions) 1 to 3 prepared above were applied onto a release-treated polyethylene terephthalate film (trade name "PET 3811", manufactured by Lintec Corporation) [hereinafter simply referred to as a "separator"] using an applicator so that the thickness after drying was 20 μm, and dried at 100° C. for 1 minute to manufacture a separator with a pressure-sensitive adhesive.

[Circularly Polarizing Plate 1]
[Manufacture of Phase Difference Film]
<Formation of Alignment Film P-1>

The following coating liquid for forming an alignment film P-1 was applied onto a glass substrate using a #18 bar coater, and the glass substrate was dried with hot air at 100° C. for 120 seconds and then subjected to a rubbing treatment to form an alignment film P-1.

| (Coating Liquid for Alignment Film P-1) | |
| --- | --- |
| Polyvinyl alcohol (PVA203 manufactured by Kuraray C., Ltd.) | 2.0 parts by mass |
| Water | 98.0 parts by mass |

<Formation of Positive A-Plate A-1>

The following composition A-1 was applied onto the alignment film P-1 using a bar coater. The coating film formed on the alignment film P-1 was heated with hot air at 180° C. and then cooled to 120° C., and the coating film was irradiated with ultraviolet rays at 100 mJ/cm$^2$ at a wavelength of 365 nm under a nitrogen atmosphere using a high-pressure mercury lamp to fix the alignment of the liquid crystal compound, thereby manufacturing a glass plate A-1 including the positive A-plate A-1. The thickness of the positive A-plate A-1 was 2.5 μm. In addition, the weighted average values of the I/O values of the liquid crystal compounds in the following composition A-1 are shown in Table 4.

| (Composition A-1) | |
| --- | --- |
| The following polymerizable liquid crystal compound L-1 | 39.00 parts by mass |
| The following polymerizable liquid crystal compound L-2 | 39.00 parts by mass |
| The following polymerizable liquid crystal compound L-3 | 17.00 parts by mass |

| (Composition A-1) | |
|---|---|
| The following polymerizable liquid crystal compound L-4 | 5.00 parts by mass |
| The following polymerization initiator PI-1 | 0.50 parts by mass |
| The following leveling agent T-1 | 0.20 parts by mass |
| Cyclopentanone | 235.00 parts by mass |

Polymerizable liquid crystal compound L-1 (I/O value: 0.49)

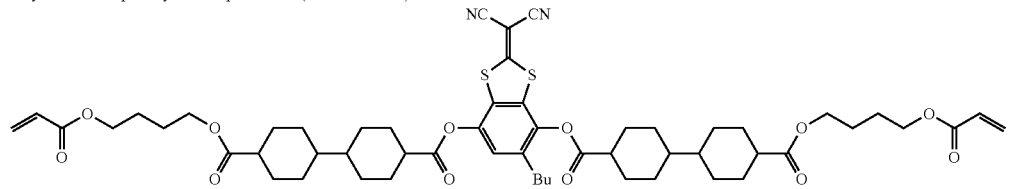

Polymerizable liquid crystal compound L-2 (I/O value: 0.52)

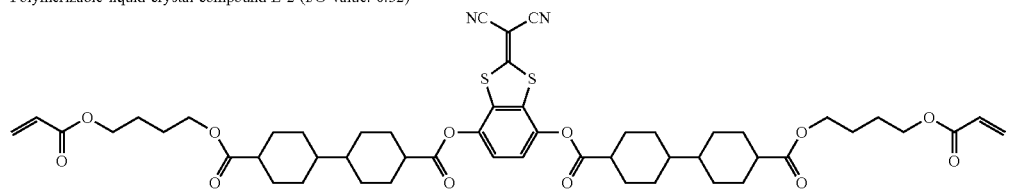

Polymerizable liquid crystal compound L-3 (I/O value: 0.50)

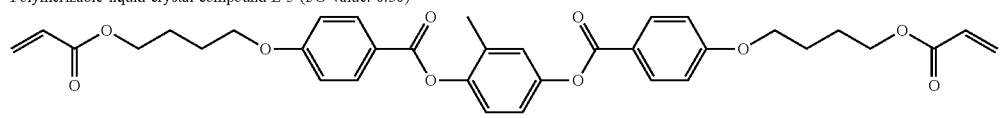

Polymerizable liquid crystal compound L-4 (I/O value: 0.37)

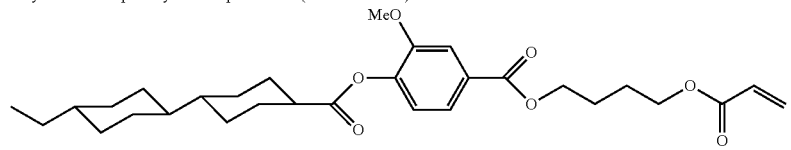

Polymerization initiator PI-1

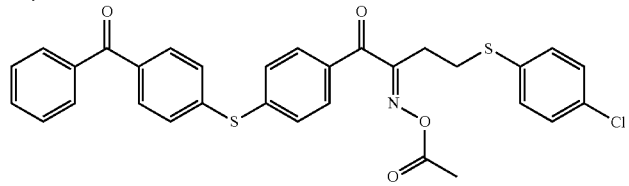

Leveling agent T-1

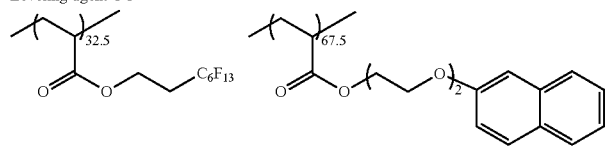

<Formation of Positive C-plate C-1>

A film C-1 having a positive C-plate C-1 on a temporary support for formation was manufactured by the same method as for the positive C-plate described in paragraph [0124] of JP2015-200861A. It should be noted that the thickness of the positive C-plate was controlled so that Rth(550) was −69 nm. In addition, the weighted average values of the I/O values of the liquid crystal compounds in the composition forming a positive C-plate C-1 are shown in Table 4 below.

[Manufacture of Circularly Polarizing Plate 1]

A roll-shaped polyvinyl alcohol film having a thickness of 80 μm was continuously stretched five times in an iodine aqueous solution, and the stretched film was dried to obtain a linear polarizer having a thickness of 20 μm.

The obtained linear polarizer and triacetyl cellulose (hereinafter simply referred to as "TAC") supports TD80UL and Z-TAC (both manufactured by FUJIFILM Corporation), which had been subjected to an alkali saponification treatment, were bonded to each other using a polyvinyl alcohol-based adhesive, thereby obtaining a polarizing plate having TD80UL, the linear polarizer, and Z-TAC laminated in this order.

Subsequently, the Z-TAC surface of the polarizing plate and the surface of the positive A-plate A-1 in the glass plate A-1 were bonded to each other with a pressure-sensitive adhesive (SK-2057, manufactured by Soken Chemical Co., Ltd.) using a laminator so that an angle formed between the absorption axis of the linear polarizer and the slow axis of the positive A-plate A-1 was 45°, and then the glass substrate on the glass plate A-1 was peeled to transfer only the positive A-plate A-1 to the polarizing plate.

Next, the surface of the transferred positive A-plate A-1 and the surface of the positive C-plate C-1 in the film C-1 prepared above were bonded to each other using a pressure-sensitive adhesive (SK-2057, manufactured by Soken Chemical Co., Ltd.), and then the temporary support for formation in the film C-1 was peeled to transfer only the positive C-plate C-1 onto the positive A-plate A-1, thereby manufacturing the circularly polarizing plate 1.

[Circularly Polarizing Plate 2]

[Manufacture of Positive A-Plate A-2 and Circularly Polarizing Plate 2]

A positive A-plate A-2 having a thickness of 2.7 μm was formed by the same method as for the circularly polarizing plate 1, except that the composition A-1 was changed to the following composition A-2 and the thickness was adjusted, thereby manufacturing a circularly polarizing plate 2. In addition, the weighted average values of the I/O values of the liquid crystal compounds in the following composition A-2 are shown in Table 4 below.

| (Composition A-2) | |
|---|---|
| The polymerizable liquid crystal compound L-1 | 60.00 parts by mass |
| The polymerizable liquid crystal compound L-2 | 20.00 parts by mass |
| The polymerizable liquid crystal compound L-3 | 15.00 parts by mass |
| The polymerizable liquid crystal compound L-4 | 5.00 parts by mass |
| The polymerization initiator PI-1 | 0.50 parts by mass |
| The leveling agent T-1 | 0.20 parts by mass |
| Cyclopentanone | 235.00 parts by mass |

[Circularly Polarizing Plate 3]

[Manufacture of Positive A-Plate A-3]

<Synthesis of Polymer PA-1 Having Photo-Alignment Group>

According to the method described for Langmuir, 32(36), 9245-9253 (2016), a monomer m-1 shown below was synthesized using 2-hydroxyethyl methacrylate (HEMA) (a reagent from Tokyo Chemical Industry Co., Ltd.) and the following cinnamic acid chloride derivative.

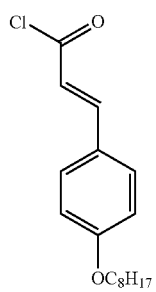

Cinnamic acid chloride derivative

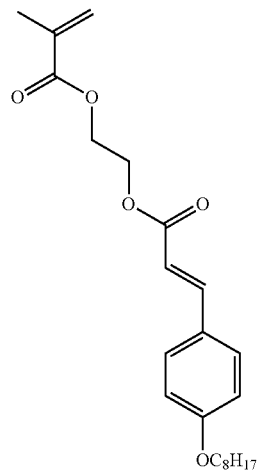

Monomer m-1

5 parts by mass of 2-butanone was introduced as a solvent into a flask equipped with a cooling pipe, a thermometer, and a stirrer, nitrogen was allowed to flow into the flask at 5 mL/min, and the flask was refluxed under heating in a water bath. A solution obtained by mixing 5 parts by mass of the monomer m-1, 5 parts by mass of CYCLOMER MIN (manufactured by Daicel Chemical Industries. Ltd.), 1 part by mass of 2,2'-azobis(isobutyronitrile) as a polymerization initiator, and 5 parts by mass of 2-butanone as a solvent was added dropwise thereto for 3 hours, and the mixture was further stirred for 3 hours while keeping the stirring state. After completion of the reaction, the mixture was left to be cooled to room temperature and diluted by addition of 30 parts by mass of 2-butanone to obtain an about 20%-by-mass polymer solution. The obtained polymer solution was put into methanol in a large excess to precipitate a polymer, and the recovered precipitate was separated by filtration and washed with a large amount of methanol, and then dried with air blast at 50° C. for 12 hours to obtain a polymer PA-1 having a photo-alignment group.

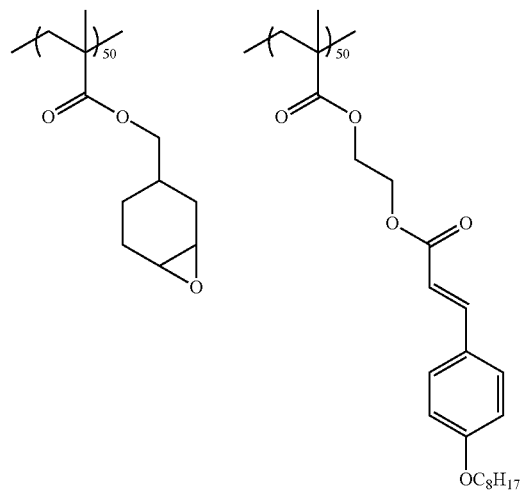

Polymer PA-1

<Manufacture of Alignment Film P-2>

A coating liquid forming an alignment film P-2 was continuously applied onto a commercially available triacetyl cellulose film "Z-TAC" (manufactured by FUJIFILM Corporation) with a #2.4 wire bar. A support having the coating film formed thereon was dried with hot air at 140° C. for 120 seconds, and subsequently irradiated with polarized ultraviolet rays (10 mJ/cm², using an ultra-high-pressure mercury lamp) to form an alignment film P-2.

| (Coating liquid for forming alignment film P-2) | |
|---|---|
| The polymer PA-1 | 100.00 parts by mass |
| Thermal acid generator (San-Aid SI-B3A, manufactured by Sanshin Chemical) | 5.00 parts by mass |
| Isopropyl alcohol | 16.50 parts by mass |
| Butyl acetate | 1,072.00 parts by mass |
| Methyl ethyl ketone | 268.00 parts by mass |

The composition A-1 was applied onto the alignment film P-2 using a bar coater. After the coating film formed on the alignment film P-2 was heated to 120° C. with hot air and then cooled to 60° C., the coating film was irradiated with ultraviolet rays at 100 mJ/cm² at a wavelength of 365 nm under a nitrogen atmosphere using a high-pressure mercury lamp, and subsequently, the coating film was irradiated with ultraviolet rays at 500 mJ/cm² under heating at 120° C. to fix the alignment of the liquid crystal compound, thereby manufacturing a TAC film A-3 having the positive A-plate A-3. The thickness of the positive A-plate A-3 was 2.5 μm.

[Manufacture of Circularly Polarizing Plate 3]

A roll-shaped polyvinyl alcohol film having a thickness of 80 μm was continuously stretched five times in an iodine aqueous solution, and the stretched film was dried to obtain a linear polarizer having a thickness of 20 μm.

The obtained linear polarizer and a TAC support TD80UL (manufactured by FUJIFILM Corporation) which has been subjected to an alkali saponification treatment were bonded to each other using a polyvinyl alcohol-based adhesive, to obtain a polarizing plate having a linear polarizer exposed on one side.

Subsequently, the exposed surface of the linear polarizer in the polarizing plate and the surface of Z-TAC in the TAC film A-3 were bonded to each other using a pressure-sensitive adhesive (SK-2057, manufactured by Soken Chemical Co., Ltd.) so that an angle between the absorption axis of the linear polarizer and the slow axis of the positive A-plate A-3 was 45°.

Next, the bonded surface of the positive A-plate A-3 in the bonded TAC film A-3 and the surface of the positive C-plate C-1 in the film C-1 manufactured above were bonded to each other using a pressure-sensitive adhesive (SK-2057) (manufactured by Soken Chemical Co., Ltd.), and the temporary support for formation in the film C-1 was peeled to transfer only the positive C-plate C-1 onto the positive A-plate A-3, thereby manufacturing a circularly polarizing plate 3.

[Circularly Polarizing Plate 4]
[Manufacture of Positive A-Plate A-4 and Circularly Polarizing Plate 4]

A positive A-plate A-4 having a thickness of 3.1 μm was formed by the same method as for the circularly polarizing plate 1, except that the composition A-1 was changed to the following composition A-4 and the thickness was adjusted, thereby manufacturing a circularly polarizing plate 4. In addition, the weighted average values of the I/O values of the liquid crystal compounds in the following composition A-4 are shown in Table 4 below.

| (Composition A-4) | |
|---|---|
| The polymerizable liquid crystal compound L-1 | 84.00 parts by mass |
| The polymerizable liquid crystal compound L-3 | 16.00 parts by mass |
| The polymerization initiator PI-1 | 0.50 parts by mass |
| The leveling agent T-1 | 0.20 parts by mass |
| Chloroform | 570.00 parts by mass |

[Circularly Polarizing Plate 5]
[Manufacture of Positive A-Plate A-5 and Circularly Polarizing Plate 5]

A positive A-plate A-5 having a thickness of 2.1 m was formed by the same method as for the circularly polarizing plate 1, except that the composition A-1 was changed to the following composition A-5 and the thickness was adjusted, thereby manufacturing a circularly polarizing plate 5. In addition, the weighted average values of the I/O values of the liquid crystal compounds in the following composition A-5 are shown in Table 4 below.

| (Composition A-5) | |
|---|---|
| The polymerizable liquid crystal compound L-2 | 73.00 parts by mass |
| The polymerizable liquid crystal compound L-3 | 27.00 parts by mass |
| The polymerization initiator PI-1 | 0.50 parts by mass |
| The leveling agent T-1 | 0.20 parts by mass |
| Chloroform | 570.00 parts by mass |

[Circularly Polarizing Plate 6]
[Manufacture of Positive C-Plate C-2]

The following composition C-2 was applied onto a temporary support for formation by a spin coating method. After the coating film formed on the temporary support for formation was heated to 120° C. on a hot plate and then cooled to 120° C., the coating film was irradiated with ultraviolet rays at 500 mJ/cm² at a wavelength of 365 nm under a nitrogen atmosphere using a high-pressure mercury lamp to fix the alignment of the liquid crystal compound, thereby manufacturing a film including the positive C-plate C-2. The thickness of the positive C-plate C-2 was 1.3 μm. In addition, the weighted average values of the i/O values of the liquid crystal compounds in the following composition C-2 are shown in Table 4 below.

| (Composition C-2) | |
|---|---|
| The polymerizable liquid crystal compound L-1 | 43.00 parts by mass |
| The polymerizable liquid crystal compound L-2 | 43.00 parts by mass |
| The polymerizable liquid crystal compound L-3 | 16.00 parts by mass |
| The polymerization initiator PI-1 | 3.00 parts by mass |
| The following leveling agent T-2 | 0.40 parts by mass |
| The following leveling agent T-3 | 0.20 parts by mass |
| The following compound L-5 | 1.00 part by mass |
| The following compound L-6 | 2.50 parts by mass |
| Chloroform | 570.60 parts by mass |

-continued (Composition C-2)

Leveling agent T-2

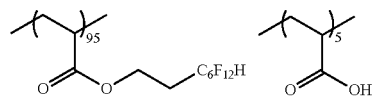

Leveling agent T-3

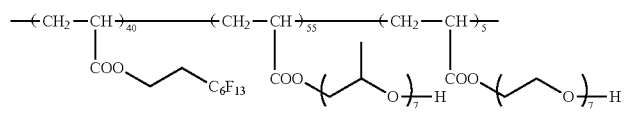

Compound L-5

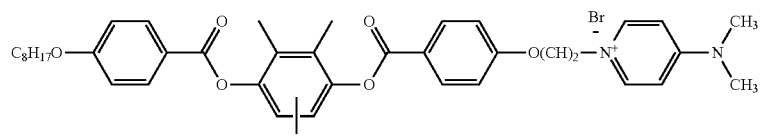

Compound L-6

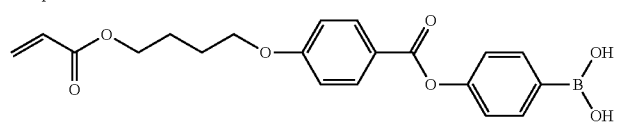

A circularly polarizing plate 6 was manufactured by the same method as for the circularly polarizing plate 1, except that the positive C-plate C-2 was used instead of the positive C-plate C-1.

[Circularly Polarizing Plate 11]

A positive A-plate A-11 having a thickness of 2.3 μm was formed by the same method as for the circularly polarizing plate 1, except that the composition A-1 was changed to the following composition A-11 and the thickness was adjusted, thereby manufacturing a circularly polarizing plate 11. In addition, the weighted average values of the I/O values of the liquid crystal compounds in the following composition A-11 are shown in Table 4 below.

[Circularly Polarizing Plate 12]

[Manufacture of Positive C-Plate C-3 and Circularly Polarizing Plate 12]

<Formation of Positive C-Plate C-3>

A positive C-plate C-3 was manufactured in the same manner as for the positive C-plate C-2, except that the following composition C-3 was used instead of the composition C-2. The thickness of the positive C-plate C-3 was 1.2 μm. The weighted average values of the I/O values of the liquid crystal compounds in Composition C-3 are shown in Table 4 below.

| (Composition A-11) | |
|---|---|
| The polymerizable liquid crystal compound L-9 | 42.00 parts by mass |
| The polymerizable liquid crystal compound L-10 | 42.00 parts by mass |
| The polymerizable liquid crystal compound L-4 | 16.00 parts by mass |
| The polymerizable initiator PI-1 | 0.50 parts by mass |
| The leveling agent T-1 | 0.20 parts by mass |
| Methyl ethyl ketone | 235.00 parts by mass |

Polymerizable liquid crystal compound L-9 (I/O value: 0.62)

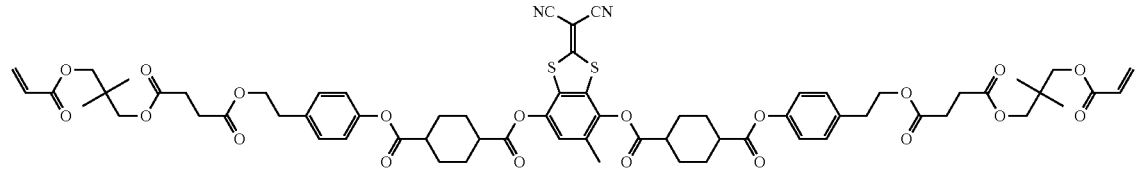 [SMILES: C=CC(=O)OCC(C)(C)COC(=O)CCC(=O)OCCc1ccc(OC(=O)C2CCC(C(=O)Oc3cc(C)c(OC(=O)C4CCC(C(=O)Oc5ccc(CCOC(=O)CCC(=O)OCC(C)(C)COC(=O)C=C)cc5)CC4)c4c3SC(=C(C#N)C#N)S4)CC2)cc1]

Mixture of Me position isomers

Polymerizable liquid crystal compound L-10 (I/O value: 0.63)

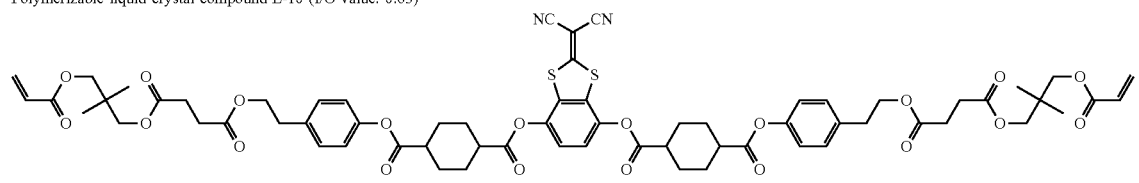

Mixture of Me position isomers

| (Composition C-3) | |
|---|---|
| The polymerizable liquid crystal compound L-9 | 42.00 parts by mass |
| The polymerizable liquid crystal compound L-10 | 42.00 parts by mass |
| The polymerizable liquid crystal compound L-4 | 16.00 parts by mass |
| The polymerization initiator PI-1 | 3.00 parts by mass |
| The leveling agent T-2 | 0.40 parts by mass |
| The leveling agent T-3 | 0.20 parts by mass |
| The compound L-5 | 1.00 part by mass |
| The compound L-6 | 2.50 parts by mass |
| Chloroform | 570.63 parts by mass |

A circularly polarizing plate 12 was manufactured by the same method as for the circularly polarizing plate 11, except that the positive C-plate C-3 was used instead of the positive C-plate C-1.

Examples 1 to 6 and Comparative Examples 1 to 4

The surface of the pressure-sensitive adhesive side of each separator with a pressure-sensitive adhesive manufactured above was bonded onto the positive C-plate of each of the circularly polarizing plate manufactured above with a laminator, and then cured under the conditions of a temperature of 23° C. and a relative humidity of 65% for 7 days to obtain a circularly polarizing plate with a pressure-sensitive adhesive. Incidentally, the type of the circularly polarizing plate and the type of the pressure-sensitive adhesive in the separator with the pressure-sensitive adhesive are as shown in Table 4 below.

[Moisture-Heat Resistance]

After the separator of the manufactured circularly polarizing plate with a pressure-sensitive adhesive was peeled, bonded to a glass plate with a laminator, and held in an environment of 85° C. and 85% for 150 hours, $\Delta ReA(550)$, $\Delta RthC(550)$, and the adhesiveness were evaluated according to the following standard. The results are shown in Table 4 below.

<$\Delta ReA(550)$>

$\Delta ReA(550)(\%)=|(ReA(550)$ before moisture-heat treatment$)-(ReA(550)$ after treatment$)|\div(ReA(550)$ before moisture-heat treatment$)\times 100$ (Evaluation Standard)
A: $\Delta ReA(550)$ is 2% or less.
B: $\Delta ReA(550)$ is more than 2% and 5% or less.
C: $\Delta ReA(550)$ is more than 5% and 10% or less.
D: $\Delta ReA(550)$ is more than 10%.

<$\Delta RthC(550)$>

$\Delta RthC(550)(\%)=|(RthC(550)$ before moisture-heat treatment$)-(RthC(550)$ after treatment$|\div(RthC(550)$ before moisture-heat treatment$)\times 100$ (Evaluation Standard)
A: $\Delta RthC(550)$ is 2% or less.
B: $\Delta RthC(550)$ is more than 2% and 5% or less.
C: $\Delta RthC(550)$ is more than 5% and 10% or less.
D: $\Delta RthC(550)$ is more than 10%.

<Adhesiveness>
(Evaluation Standard)
A: A change in appearance such as floating, peeling, and foaming is not observed at all.
B: A change in appearance such as floating, peeling, and foaming is almost not observed.
C: A change in appearance such as floating, peeling, and foaming is slightly remarkable.
D: A change in appearance such as floating, peeling, and foaming is remarkably observed.

(Antistatic Properties)

The surface electrical resistance of the pressure-sensitive adhesive in a case of peeling the separator of the obtained circularly polarizing plate with a pressure-sensitive adhesive was measured using a surface intrinsic electrical resistance measurement apparatus ["Hiresta-up MCP-HT450" (trade name, manufactured by Mitsubishi Chemical Corporation)], thereby evaluating the antistatic properties. In a case where the surface electrical resistance is on the order of $10^{11} \Omega/\square$ or less, good antistatic properties can be obtained. Evaluation of the antistatic properties was performed immediately after completing the curing of the polarizing film with an adhesive. The results are summarized in Table 4 below.

TABLE 4

| | | Phase difference film | | | | | | | |
|---|---|---|---|---|---|---|---|---|---|
| | | Positive A-plate | | Positive C-plate | | | Evaluation | | |
| | Circularly polarizing Plate | Type | Weighted average of I/O values | Type | Weighted average of I/O values | Pressure-sensitive adhesive | Moisture-heat durability | | Antistatic property ($\Omega$/sq) |
| | | | | | | | $\Delta ReA(550)$ | $\Delta RthC(550)$ Adhesiveness | |
| Example 1 | Circularly polarizing plate 1 | A-1 | 0.50 | C-1 | 0.50 | 1 | A | A A | $10^{-11}$ |
| Example 2 | Circularly polarizing plate 2 | A-2 | 0.49 | C-1 | 0.50 | 1 | A | A A | $10^{-11}$ |
| Example 3 | Circularly polarizing plate 3 | A-3 | 0.50 | C-1 | 0.50 | 1 | A | A A | $10^{-11}$ |
| Example 4 | Circularly polarizing plate 4 | A-4 | 0.49 | C-1 | 0.50 | 1 | A | A A | $10^{-11}$ |
| Example 5 | Circularly polarizing plate 5 | A-5 | 0.51 | C-1 | 0.50 | 1 | B | A A | $10^{-11}$ |
| Example 6 | Circularly polarizing plate 6 | A-1 | 0.50 | C-2 | 0.50 | 1 | A | A A | $10^{-11}$ |

TABLE 4-continued

| | | Phase difference film | | | | Evaluation | | | |
| | | Positive A-plate | | Positive C-plate | | | | | |
| | Circularly polarizing Plate | Type | Weighted average of I/O values | Type | Weighted average of I/O values | Pressure-sensitive adhesive | Moisture-heat durability | | Antistatic property (Ω/sq) |
| | | | | | | | ΔReA(550) | ΔRthC(550) | Adhesiveness | |
|---|---|---|---|---|---|---|---|---|---|---|
| Comparative Example 1 | Circularly polarizing plate 11 | A-11 | 0.58 | C-1 | 0.50 | 1 | D | A | A | $10^{-11}$ |
| Comparative Example 2 | Circularly polarizing plate 1 | A-1 | 0.50 | C-1 | 0.50 | 2 | A | A | D | $10^{-11}$ |
| Comparative Example 3 | Circularly polarizing plate 1 | A-1 | 0.50 | C-1 | 0.50 | 3 | A | A | A | $10^{-10}$ |
| Comparative Example 4 | Circularly polarizing plate 12 | A-11 | 0.58 | C-3 | 0.58 | 1 | D | D | A | $10^{-11}$ |

From the results shown in Table 4, it was found that in a case where a positive A-plate was formed using a polymerizable liquid crystal compound not corresponding to Formula (I), ΔReA(550) was evaluated as D, and the display performance after exposure to a moisture-heat environment was deteriorated (Comparative Examples 1 and 4).

Moreover, it was found that in a case where a pressure-sensitive adhesive containing an acryl resin having an acid value of 0 mgKOH/g was used, the adhesiveness was deteriorated (Comparative Example 2).

In addition, it was found that in a case where a pressure-sensitive adhesive in which an antistatic agent was not blended was used, the surface electrical resistance was increased and the destruction of the image display panel due to static electricity carried on the phase difference film could not be suppressed (Comparative Example 3).

In contrast, it was found that in a case where an optically anisotropic layer formed using the polymerizable liquid crystal compound (I) was used as the phase difference film and a pressure-sensitive adhesive containing a polymer having an acid value of 1 to 30 mgKOH/g and an antistatic agent was used, the surface electrical resistance was decreased, the change in the retardation was small even in a moisture-heat environment, and the adhesiveness was also improved (Examples 1 to 6).

EXPLANATION OF REFERENCES 10 phase difference film
12 positive A-plate
14 positive C-plate
16 circularly polarizing plate
18 linear polarizer
20 organic EL display device
22 organic EL display panel

What is claimed is:
1. An image display device comprising:
a circularly polarizing plate having a linear polarizer and a phase difference film; and an image display panel in this order from a viewing side,
wherein the phase difference film included in the circularly polarizing plate, and the image display panel are bonded by a pressure-sensitive adhesive layer,
the phase difference film has an optically anisotropic layer obtained by polymerizing a polymerizable liquid crystal composition containing at least one kind of polymerizable liquid crystal compound represented by Formula (I),
the optically anisotropic layer is both a λ/4 plate and a positive A plate,
wherein the positive A plate satisfies the relationship of Formula (A1) where a refractive index in an in-plane slow axis direction (in a direction in which an in-plane refractive index is maximum) is defined as nx, a refractive index in an in-plane direction perpendicular to the in-plane slow axis is defined as ny, and a refractive index in a thickness direction is defined as nz, and Rth is a positive value:

$$nx > ny \approx nz \quad \text{Formula (A1)},$$

$Rth(\lambda) = ((nx+ny)/2-nz) \times d$, in which d is the thickness of the plate, and
the pressure-sensitive adhesive layer contains a polymer having an acid value of 1 to 30 mgKOH/g and an antistatic agent,

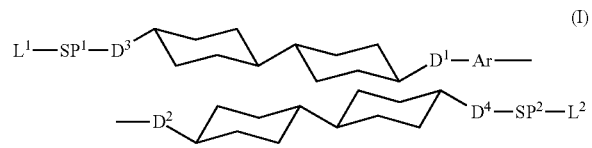

in Formula (I), $D^1$, $D^2$, $D^3$, and $D^4$ each independently represent a single bond, —CO—O—, —C(=S)O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—O—CO—$CR^3R^4$—, —$CR^1R^2$—CO—O—$CR^3R^4$—, —$NR^1CR^2R^3$—, or —CO—$NR^1$—, and $R^1$, $R^2$, $R^3$, and $R^4$ each independently represent a hydrogen atom, a fluorine atom, or an alkyl group having 1 to 4 carbon atoms,
$SP^1$ and $SP^2$ each independently represent a single bond, a linear or branched alkylene group having 1 to 12 carbon atoms, or a divalent linking group m which one or more of —$CH_2$-'s constituting the linear or branched alkylene group having 1 to 12 carbon atoms are substituted with —O—, —S—, —NH—, —N(Q)-, or —CO—, and Q represents a substituent, L¹ and L² each independently represent a monovalent organic group, and at least one of L¹ or L² represents a polymerizable group, provided that in a case where Ar is an aromatic ring represented by Formula (Ar-3), at least one of L¹ or L², or L³ or L⁴ in Formula (Ar-3) represents a polymerizable group, and Ar represents any aromatic ring selected from the group consisting of groups represented by Formulae (Ar-1) to (Ar-5),

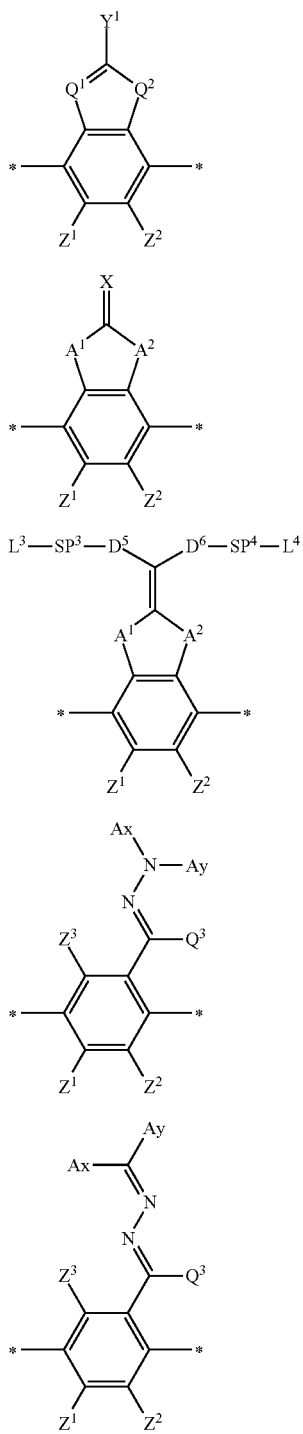

in Formulae (Ar-1) to (Ar-5), * represents a bonding position to D¹ or D²,

Q¹ represents N or CH,

Q² represents —S—, —O—, or —N(R⁵)—, and R⁵ represents a hydrogen atom or an alkyl group having 1 to 6 carbon atoms, Y¹ represents an aromatic hydrocarbon group having 6 to 12 carbon atoms or an aromatic heterocyclic group having 3 to 12 carbon atoms, each of which may have a substituent, Z¹, Z², and Z³ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, —OR⁶, —NR⁷R⁸, or —SR⁹, R⁶ to R⁹ each independently represent a hydrogen atom or an alkyl group having 1 to 6 carbon atoms, and Z¹ and Z² may be bonded to each other to form an aromatic ring, A¹ and A² each independently represent a group selected from the group consisting of —O—, —N(R¹⁰)—, —S—, and —CO—, and R¹⁰ represents a hydrogen atom or a substituent, X represents a non-metal atom of one of Groups XIV to XVI, to which a hydrogen atom or a substituent may be bonded, D⁵ and D⁶ each independently represent a single bond, —CO—O—, —C(=S)O—, —CR¹R²—, —CR¹R²—CR³R⁴—, —O—CR¹C R²—, —CR¹R²—O—CR³R⁴—, —CO—O—CR¹R²—, —O—CO—CR¹R²—, —C¹R²—O—CO—CR³R⁴—, —CR¹R²—CO—O—CR³R⁴—, —NR¹—CR²R³—, or —CO—NR¹, and R¹, R², R³, and R⁴ each independently represent a hydrogen atom, a fluorine atom, or an alkyl group having 1 to 4 carbon atoms, SP³ and SP⁴ each independently represent a single bond, a linear or branched alkylene group having 1 to 12 carbon atoms, or a divalent linking group in which one or more of —CH₂—'s constituting the linear or branched alkylene group having 1 to 12 carbon atoms are substituted with —O—, —S—, —NH—, —N(Q)-, or —COQ-, and Q represents a substituent, L³ and L⁴ each independently represent a monovalent organic group, and at least one of L³ or L⁴, or L¹ or L² in Formula (I) represents a polymerizable group, Ax represents an organic group having 2 to 30 carbon atoms, which has at least one aromatic ring selected from the group consisting of an aromatic hydrocarbon ring and an aromatic heterocyclic ring, Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring, the aromatic rings in each of Ax and Ay may have a substituent, and Ax and Ay may be bonded to each other to form a ring, and Q³ represents a hydrogen atom, or an alkyl group having 1 to 6 carbon atoms, which may have a substituent.

2. The image display device according to claim 1, wherein at least one kind of the polymerizable liquid crystal compound represented by Formula (I) has a van der Waals volume of Z¹ or Z² contained in Ar in Formula (I) of 0.3×10² Å³ or more.

3. The image display device according to claim 1, wherein an I/O value of the liquid crystal compound included in the polymerizable liquid crystal composition is 0.51 or less as a weighted average value.

4. The image display device according to claim 1, wherein Ar in Formula (I) represents a group represented by Formula (Ar-2).

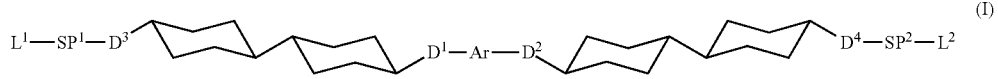

5. The image display device according to claim 1, wherein the polymerizable liquid crystal composition contains a polymerizable compound not corresponding to Formula (I) and having two or more polymerizable groups.

6. The image display device according to claim 1, wherein the polymerizable liquid crystal composition contains a polymerization initiator.

7. The image display device according to claim 6, wherein the polymerization initiator is an oxime-type polymerization initiator.

8. The image display device according to claim 1, wherein the optically anisotropic layer satisfies Formula (II), $$0.50 < Re(450)/Re(550) < 1.00 \quad (II)$$

in Formula (II), Re(450) represents an in-plane retardation of the optically anisotropic layer at a wavelength of 450 nm, and Re(550) represents an in-plane retardation of the optically anisotropic layer at a wavelength of 550 nm.

9. The image display device according to claim 1, wherein an angle between the slow axis of the optically anisotropic layer and the absorption axis of the linear polarizer is 30° to 60°.

10. The image display device according to claim 1, wherein the phase difference film further has an optically anisotropic layer that is a positive C-plate, and this optically anisotropic layer is obtained by polymerizing a different polymerizable liquid crystal composition containing at least one kind of a polymerizable liquid crystal compound represented by Formula (I) above.

11. A circularly polarizing plate comprising:
a linear polarizer;
a phase difference film; and
a pressure-sensitive adhesive layer in this order,
wherein the phase difference film has an optically anisotropic layer obtained by polymerizing a polymerizable liquid crystal composition containing at least one kind of polymerizable liquid crystal compound represented by Formula (I),
the optically anisotropic layer is both a λ/4 plate and a positive A plate,
wherein the positive A plate satisfies the relationship of Formula (A1) where a refractive index in an in-plane slow axis direction (in a direction in which an in-plane refractive index is maximum) is defined as nx, a refractive index in an in-plane direction perpendicular to the in-plane slow axis is defined as ny, and a refractive index in a thickness direction is defined as nz, and Rth is a positive value:

$$nx > ny \approx nz \quad \text{Formula (A1)}$$

Rth(λ)=((nx+ny)/2−nz)×d, in which d is the thickness of the plate, and the pressure-sensitive adhesive layer contains a polymer having an acid value of 1 to 30 mgKOH/g and an antistatic agent, in Formula (I), $D^1$, $D^2$, $D^3$, and $D^4$ each independently represent a single bond, —CO—O—, —C(=S)O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—O—CO—$CR^3R^4$—, —$CR^1R^2$—CO—O—$CR^3R^4$—, —$NR^1CR^2R^3$—, or —CO—$NR^1$—, and $R^1$, $R^2$, $R^3$, and $R^4$ each independently represent a hydrogen atom, a fluorine atom, or an alkyl group having 1 to 4 carbon atoms, $SP^1$ and $SP^2$ each independently represent a single bond, a linear or branched alkylene group having 1 to 12 carbon atoms, or a divalent linking group m which one or more of —$CH_2$—'s constituting the linear or branched alkylene group having 1 to 12 carbon atoms are substituted with —O—, —S—, —NH—, —N(Q)-, or —CO—, and Q represents a substituent, $L^1$ and $L^2$ each independently represent a monovalent organic group, and at least one of $L^1$ or $L^2$ represents a polymerizable group, provided that in a case where Ar is an aromatic ring represented by Formula (Ar-3), at least one of $L^1$ or $L^2$, or $L^3$ or $L^4$ in Formula (Ar-3) represents a polymerizable group, and Ar represents any aromatic ring selected from the group consisting of groups represented by Formulae (Ar-1) to (Ar-5),

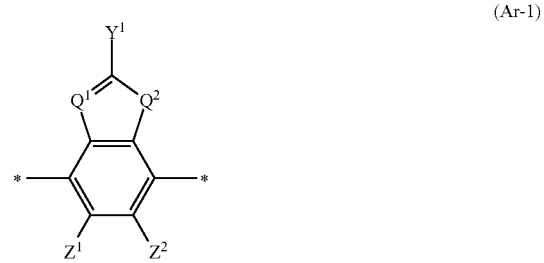

(Ar-1)

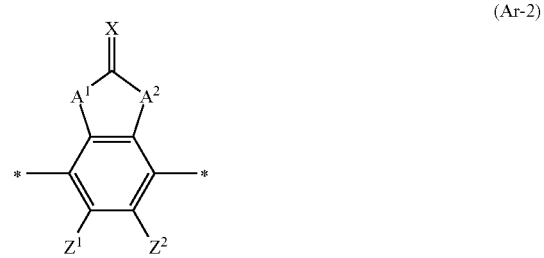

(Ar-2)

-continued

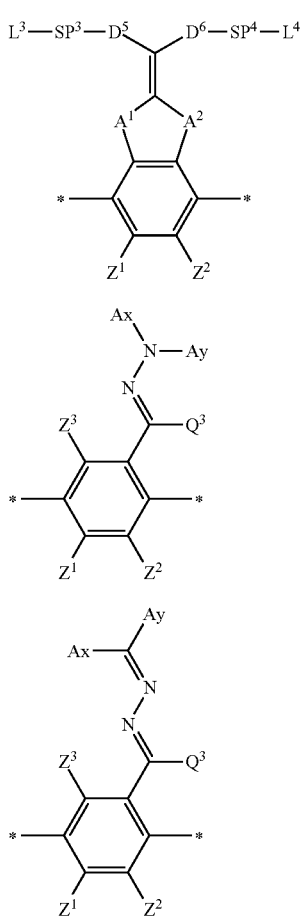

in Formulae (Ar-1) to (Ar-5), * represents a bonding position to $D^1$ or $D^2$,
$Q^1$ represents N or CH,
$Q^2$ represents —S—, —O—, or —N($R^5$)—, and $R^5$ represents a hydrogen atom or an alkyl group having 1 to 6 carbon atoms,
$Y^1$ represents an aromatic hydrocarbon group having 6 to 12 carbon atoms or an aromatic heterocyclic group having 3 to 12 carbon atoms, each of which may have a substituent,
$Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, —$OR^6$, —$NR^7R^8$, or —$SR^9$, $R^6$ to $R^9$ each independently represent a hydrogen atom or an alkyl group having 1 to 6 carbon atoms, and $Z^1$ and $Z^2$ may be bonded to each other to form an aromatic ring,
$A^1$ and $A^2$ each independently represent a group selected from the group consisting of —O—, —N($R^{10}$)—, —S—, and —CO—, and $R^{10}$ represents a hydrogen atom or a substituent,
X represents a non-metal atom of one of Groups XIV to XVI, to which a hydrogen atom or a substituent may be bonded,
$D^5$ and $D^6$ each independently represent a single bond, —CO—O—, —C(=S)O—, —$CR^1R^2$—, —$CR^1R^2$—$CR^3R^4$—, —O—$CR^1C R^2$—, —$CR^1R^2$—O—$CR^3R^4$—, —CO—O—$CR^1R^2$—, —O—CO—$CR^1R^2$—, —$C^1R^2$—O—CO—$CR^3R^4$—, —$CR^1R^2$—CO—O—$CR^3R^4$—, —$NR^1$—$CR^2R^3$—, or —CO—$NR^1$, and $R^1$, $R^2$, $R^3$, and $R^4$ each independently represent a hydrogen atom, a fluorine atom, or an alkyl group having 1 to 4 carbon atoms,
$SP^3$ and $SP^4$ each independently represent a single bond, a linear or branched alkylene group having 1 to 12 carbon atoms, or a divalent linking group in which one or more of —$CH_2$—'s constituting the linear or branched alkylene group having 1 to 12 carbon atoms are substituted with —O—, —S—, —NH—, —N(Q)-, or —COQ-, and Q represents a substituent,
$L^3$ and $L^4$ each independently represent a monovalent organic group, and at least one of $L^3$ or $L^4$, or $L^1$ or $L^2$ in Formula (I) represents a polymerizable group,
Ax represents an organic group having 2 to 30 carbon atoms, which has at least one aromatic ring selected from the group consisting of an aromatic hydrocarbon ring and an aromatic heterocyclic ring,
Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring,
the aromatic rings in each of Ax and Ay may have a substituent, and Ax and Ay may be bonded to each other to form a ring, and
$Q^3$ represents a hydrogen atom, or an alkyl group having 1 to 6 carbon atoms, which may have a substituent.

12. The image display device according to claim 2,
wherein an I/O value of the liquid crystal compound included in the polymerizable liquid crystal composition is 0.51 or less as a weighted average value.

13. The image display device according to claim 2,
wherein Ar in Formula (I) represents a group represented by Formula (Ar-2).

14. The image display device according to claim 2,
wherein the polymerizable liquid crystal composition contains a polymerizable compound not corresponding to Formula (I) and having two or more polymerizable groups.

15. The image display device according to claim 2,
wherein the polymerizable liquid crystal composition contains a polymerization initiator.

16. The image display device according to claim 15,
wherein the polymerization initiator is an oxime-type polymerization initiator.

17. The image display device according to claim 2,
wherein the optically anisotropic layer satisfies Formula (II), $$0.50 < Re(450)/Re(550) < 1.00 \tag{II}$$

in Formula (II), Re(450) represents an in-plane retardation of the optically anisotropic layer at a wavelength of 450 nm, and Re(550) represents an in-plane retardation of the optically anisotropic layer at a wavelength of 550 nm.

18. The image display device according to claim 2,
wherein an angle between the slow axis of the optically anisotropic layer and the absorption axis of the linear polarizer is 30° to 60°.

19. The image display device according to claim 2,
wherein the phase difference film further has an optically anisotropic layer that is a positive C-plate, and this optically anisotropic layer is obtained by polymerizing a different polymerizable liquid crystal composition containing at least one kind of a polymerizable liquid crystal compound represented by Formula (I) above.

20. The image display device according to claim 3, wherein Ar in Formula (represents a group represented by Formula (Ar-2).

\* \* \* \* \*